(12) United States Patent
Shirai et al.

(10) Patent No.: US 8,094,410 B2
(45) Date of Patent: Jan. 10, 2012

(54) SPINDLE MOTOR WITH FLANGE LAND PORTION FOR ENSURING FLATNESS OF RECORDING DISC

(75) Inventors: Akihito Shirai, Ehime (JP); Naoshi Kainoh, Ehime (JP)

(73) Assignee: Panasonic Corporation, Osaka (JP)

( * ) Notice: Subject to any disclaimer, the term of this patent is extended or adjusted under 35 U.S.C. 154(b) by 1221 days.

(21) Appl. No.: 11/516,499

(22) Filed: Sep. 7, 2006

(65) Prior Publication Data

US 2007/0058291 A1 Mar. 15, 2007

(30) Foreign Application Priority Data

Sep. 9, 2005 (JP) ................... 2005-261743

(51) Int. Cl.
*G11B 17/02* (2006.01)
*G11B 33/14* (2006.01)
(52) U.S. Cl. .................. 360/99.12; 360/97.03
(58) Field of Classification Search ............... 360/98.01, 360/98.02, 98.03, 99.08, 99.09, 99.11, 99.12
See application file for complete search history.

(56) References Cited

U.S. PATENT DOCUMENTS

| 5,517,374 | A | * | 5/1996 | Katakura et al. | 360/98.07 |
| 6,208,486 | B1 | * | 3/2001 | Gustafson et al. | 360/98.08 |
| 6,249,505 | B1 | * | 6/2001 | Miyamoto et al. | 369/266 |
| 6,304,412 | B1 | * | 10/2001 | Voights | 360/98.08 |
| 7,109,620 | B2 | | 9/2006 | Fujii et al. | |
| 2003/0202277 | A1 | * | 10/2003 | Takeda | 360/99.12 |
| 2004/0190802 | A1 | | 9/2004 | Gomyo et al. | |
| 2005/0104464 | A1 | | 5/2005 | Fujii et al. | |
| 2005/0185329 | A1 | * | 8/2005 | Miyajima et al. | 360/99.08 |

FOREIGN PATENT DOCUMENTS

| CN | 1617425 | 5/2005 |
| JP | 6-178490 | 6/1994 |
| JP | 11-312359 | 11/1999 |
| JP | 2004-263863 | 9/2004 |

OTHER PUBLICATIONS

Chinese Office Action (along with English language translation) issued Aug. 7, 2009 in the Chinese Application No. 200610129144.2.

* cited by examiner

*Primary Examiner* — Joseph Feild
*Assistant Examiner* — Gustavo Polo
(74) *Attorney, Agent, or Firm* — Wenderoth, Lind & Ponack, L.L.P.

(57) ABSTRACT

A spindle motor rotatably drives recording discs, and includes a base plate, a stator, a rotor hub, a yoke, a rotor magnet, and a hydrodynamic bearing. The hub includes a disc support cylindrical portion for supporting the recording discs in the radial direction, an annular disc mount portion formed on an outer circumference of the cylindrical portion for mounting the recording discs thereon, and an annular projection formed on the lower portion of the disc mount portion in the axial direction and having an outer circumference to which the yoke is fixed. The disc mount portion is formed with an annular non-contact surface formed on the upper portion in the axial direction, and an annular disc receiving face formed around an outer circumference of the non-contact surface and upward of the non-contact surface in the axial direction for being in contact with the recording disc in the axial direction.

6 Claims, 14 Drawing Sheets

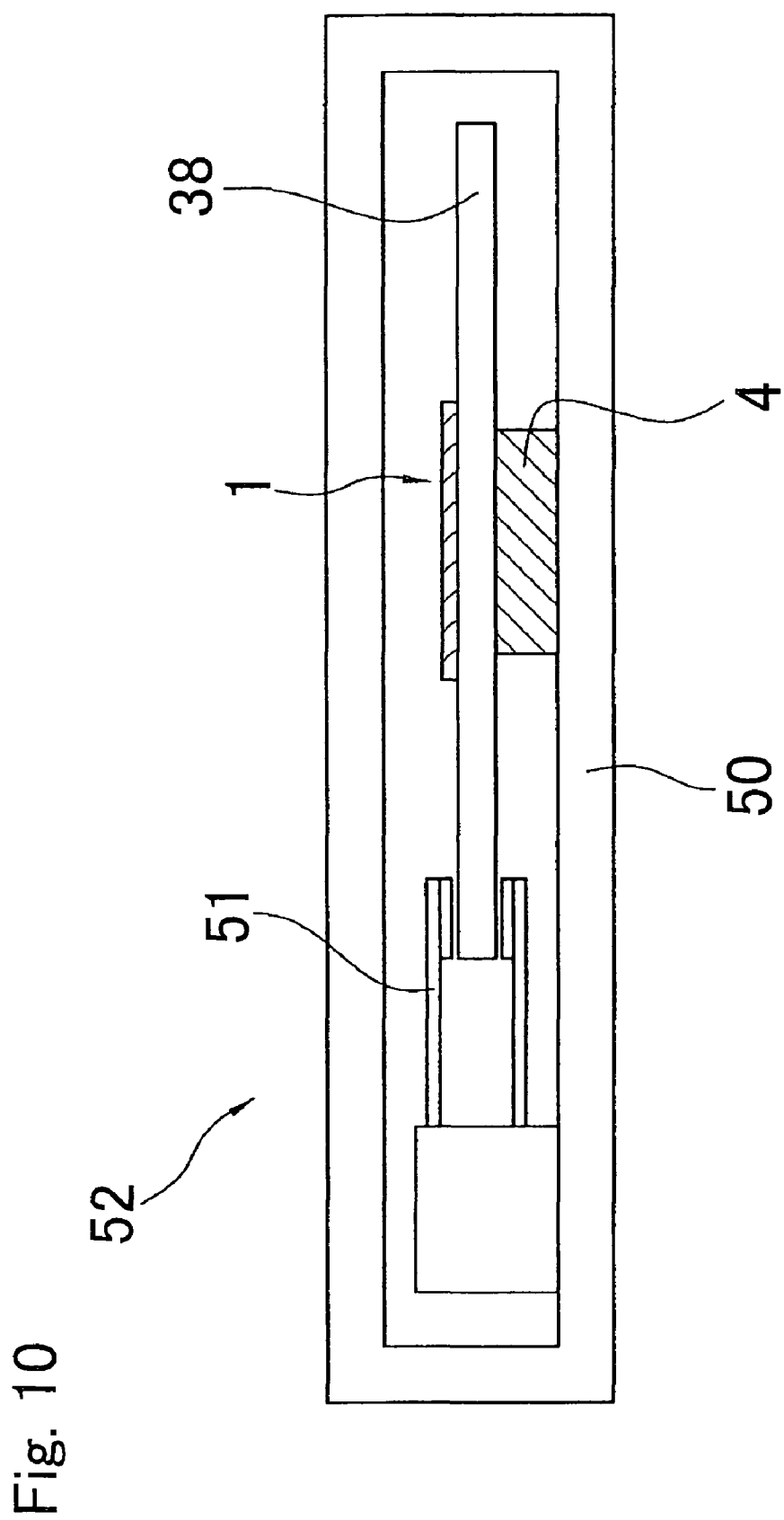

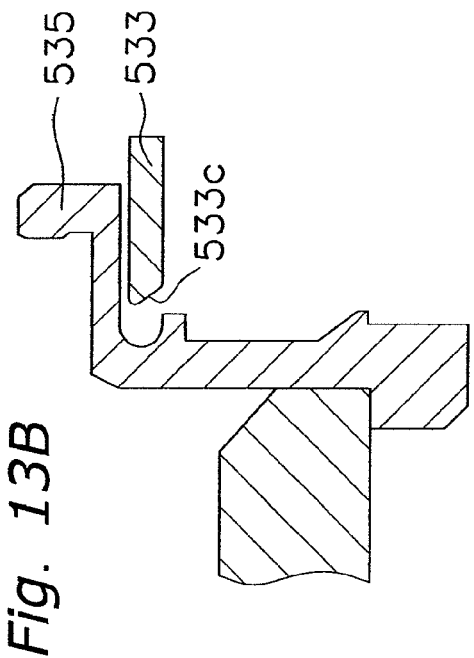
PRIOR ART
Fig. 13A
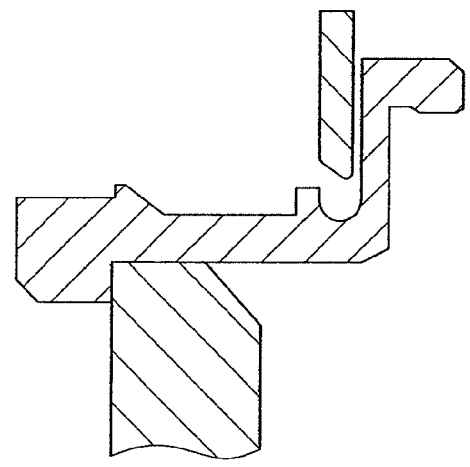
PRIOR ART
Fig. 13B
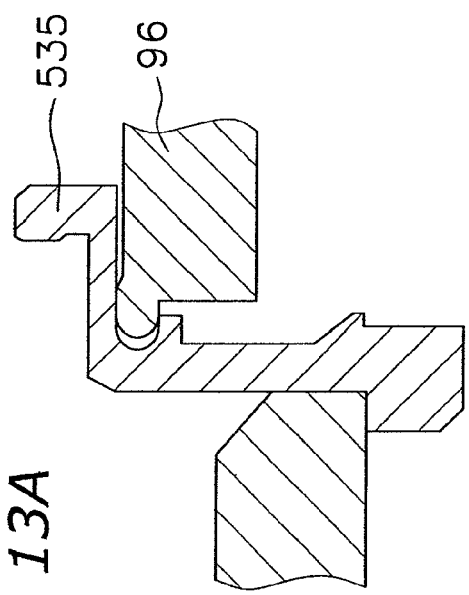
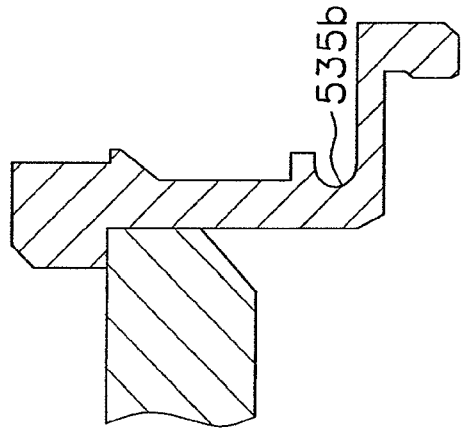

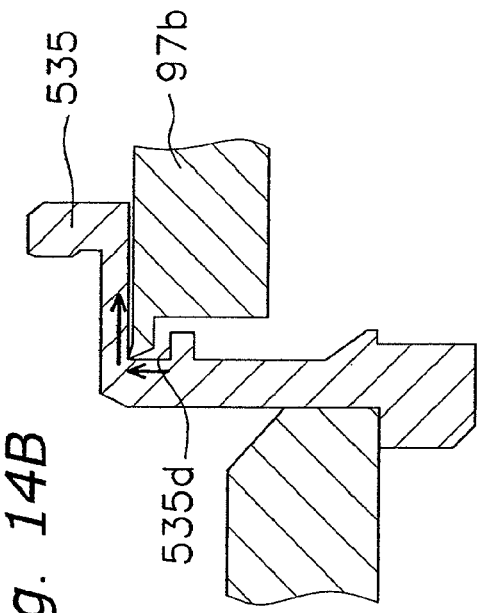
PRIOR ART
Fig. 14A
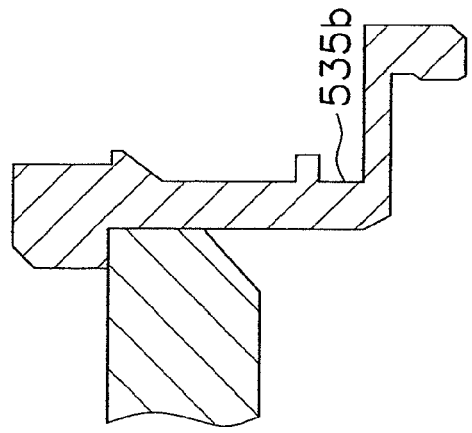
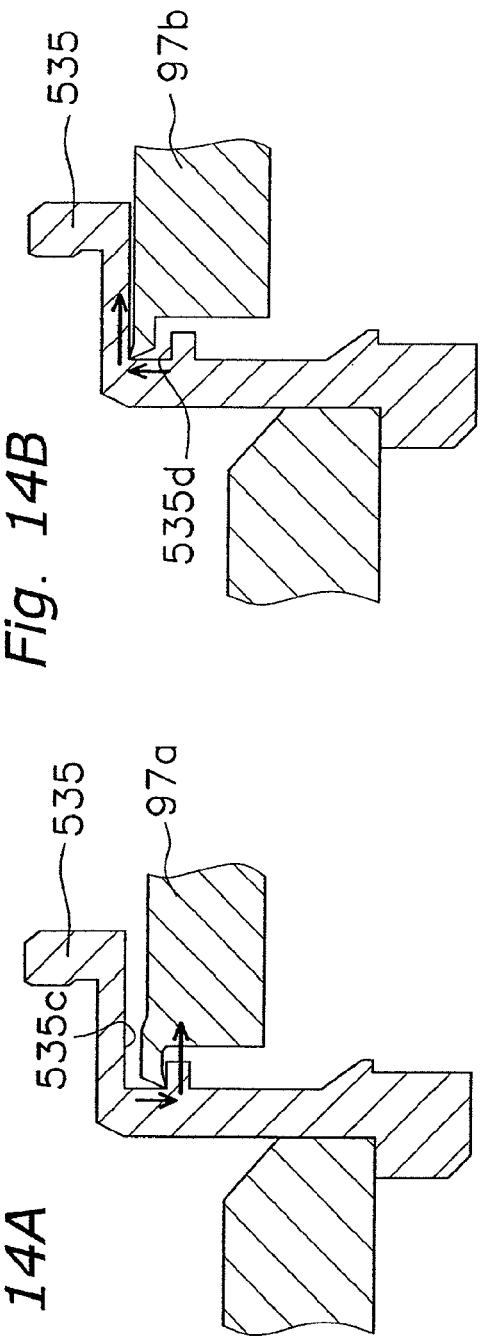
PRIOR ART
Fig. 14B
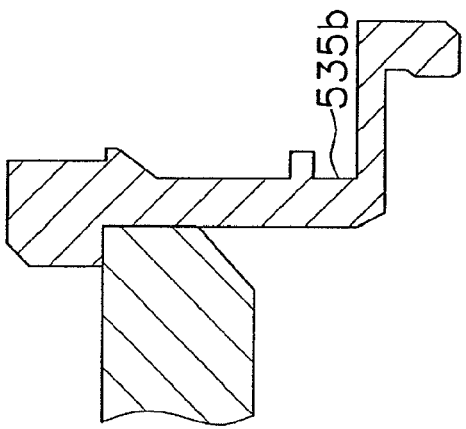

SPINDLE MOTOR WITH FLANGE LAND PORTION FOR ENSURING FLATNESS OF RECORDING DISC

CROSS-REFERENCE TO RELATED APPLICATIONS

This application claims priority to Japanese Patent Application No. JP2005-261743. The entire disclosures of Japanese Patent Application No. JP2005-261743 is hereby incorporated herein by reference.

BACKGROUND OF THE INVENTION

I. Field of the Invention

The present invention relates to a spindle motor and a method of manufacturing the same, particularly to spindle motor for rotatably driving recording discs such as magnetic discs and optical discs and a method of manufacturing the same.

II. Description of the Related Art

Spindle motors have been known as motors to rotatably drive recording discs such as magnetic discs and optical discs in hard disc drives.

The conventional spindle motor mainly comprises a base plate, a stator provided on the base plate, a rotor to which the recording disc is attached, and a hydrodynamic bearing provided on the base plate for rotatably supporting the rotor hub relative to the base plate. The rotor includes a rotor hub to which the recording disc is attached, an annular yoke provided on the rotor hub, and an annular rotor magnet provided on the yoke opposite an outer circumference of the stator in the radial direction (for example, refer to Unexamined Patent Publications 2004-263863, H11-312359, and H06-178490).

The recording wave length and the track pitch of the recording disc have become remarkably smaller because the recording density has been improved to a large extent. Accordingly, deformation of the recording discs such as curling and deflection or vibrations of the rotating recording disc make it impossible to follow the head to desired tracks when recording or reproducing. Especially, since the head of the magnetic disc drive floats with a micro-amount of the float on the order of 10 nm, the head and the recording disc might come into contact with each other due to the deformation or the vibration of the recording disc. Therefore, in the spindle motor, it is very important to reduce the deformation of the rotor hub during the manufacturing process or when the recording disc is clamped to ensure the flatness of the recording disc. It is also very important to reduce the vibration of the rotor.

However, in some cases, the rotor hub is deformed during the process of assembling the rotor hub and the yoke. In this case, the rotor hub in Unexamined Patent Publication H06-178490 will be explained as an example. FIG. 11 is a view of a yoke 533 and a hub 531 at the conventional assembling. The rotor hub 531 includes a disc support cylindrical portion 535 for supporting the recording disc in the radial direction, an annular disc mount portion 536 formed on the outer circumference of the disc support cylindrical portion 535 to mount the recording disc thereon, and an annular projection 537 formed on a side of the disc mount portion 536 in the axially opposite direction to the recording disc and having an outer circumference to which the yoke 533 is fixed.

When the yoke 533 is assembled to the rotor hub 531, for example, as shown in FIG. 11(a), the rotor hub 531 is set into a jig 590 such that a disc receiving face 536b of the disc mount portion 536 comes into contact with the jig 590. Then, the yoke 533 is press-fitted around the outer circumference of the annular projection 537 of the rotor hub 531. An annular recess 538 is formed radially inward of the disc receiving face 536b to prevent the contact between the disc mount portion 536 and the recording disc, so that the strength of the disc mount portion 536 is deteriorated at this portion. Accordingly, the disc mount portion 536 may be deformed when the yoke 533 is press-fitted, depending on the positional relationship between the annular projection 537 and the disc receiving face 536b. Furthermore, since a load is applied to the disc receiving face 536b when the yoke 533 is press-fitted, the disc receiving face 536b might be flawed and the disc receiving face 536b might be deformed. Alternatively, as shown in FIG. 11(b), the outer circumference of the end of a disc support cylindrical portion 535 is supported by a jig 595 in order to protect the disc receiving face 536b. In this case, since the disc receiving face 536b is not supported when the yoke 533 is press-fitted, a bending moment is applied to the disc mount portion 536 so that the disc mount portion 536 is deformed.

As described above, if the disc mount portion is deformed during the manufacturing process, it cannot ensure the flatness of the disc receiving face, i.e., the flatness of the recording disc. In addition, in order to ensure the flatness of the recording disc, it is typically necessary to perform highly precise additional processing on the disc receiving face after the yoke is press-fitted, so that the cost of manufacturing becomes high. However, even if the highly precise additional processing is performed, residual stress at the deformation might remain. Consequently, stress relaxation of the rotor hub 531 occurs as deterioration with age so that micro-deformation is generated, thereby to progress curling or deformation of the disc. Therefore, when the yoke is press-fitted around the annular projection, it is necessary to prevent the deformation of the disc mount portion.

In contrast, if the yoke is fixed by adhesive, not by press-fitting, since a large load is not applied to the annular projection and the disc mount portion, it is possible to prevent the deformation of the disc mount portion. However, if the yoke is fixed by the adhesive, it is necessary to provide an applicator for the adhesive. In addition, in order to prevent the out gas from being generated from the adhesive, it is necessary to bake bonded products for a long time in a adhesive clean oven installed in the clean room after the hardening. In other words, it is necessary to provide the clean room and the clean oven as well as the coater if the adhesive is used. If production amounts of the spindle motors reach a level of several tens of thousands a day, it is necessary to consume great energy to operate the manufacturing apparatuses, so that the cost of manufacturing becomes high. From a standpoint of the Earth's environment protection, it is also necessary to reduce the power consumption during the manufacturing process. Therefore, during the manufacturing process of the spindle motor, it is preferable not to use the adhesive if possible. It is preferable to press-fit the yoke around the rotor hub.

Consequently, it is very important to prevent the deformation of the disc mount portion of the rotor hub when the yoke is press-fitted, from standpoints such as the performance of the spindle motor, the cost of manufacturing, and the Earth's environment protection.

In spindle motors disclosed in Unexamined Patent Publications H11-312359 and H06-178490, the yoke has a tubular yoke main body, and a fixing part extending from the end of the yoke main body radially inward. The yoke of this type has, as shown in FIG. 12, a fixing part 533b is in contact with a rotor magnet 534 in the axial direction, so that a fringe magnetic field 95 (dashed lines in the figure) of a main pole at a radially inner portion of the rotor magnet 534 is attracted to the edge of a radially inner portion of the fixing part 533b of the yoke 533. Consequently, the flux linkages 94 (bold lines in the figure) to a stator core 505 is decreased and the magnetic flux is likely to be leaked toward the discs 81, so that magnetic noises are applied to a head 90 mounted on an actuator 91. As a result, it is difficult to perform normal recording and reproduction in a magnetic recording and reproducing apparatus, such as hard disc drives.

Furthermore, since the top face of the yoke and the rotor magnet are closely located, the amount of leakage flux from the magnet to the yoke is likely to fluctuate depending on the form accuracy of the yoke or the rotor magnet end face. Consequently, the amount of flux linkages with the stator core is likely to vary so that motor vibrations are generated.

Furthermore, in a case that the upper end of the rotor magnet is in contact with the fixing part of the yoke, if the thickness of the fixing part of the yoke is varied and the height of the contact surface of the fixing part is varied, positions of the rotor magnet in the axial direction are not constant along the circumferential direction. As a result, the relative height between the rotor magnet and the stator core varies, so that axial vibrations or cogging vibrations are generated between the stator core and the rotor magnet due to the magnetic imbalance in the axial direction.

Typically, when the hydrodynamic bearings are used for the spindle motors, in order to reduce the variation of the position of the rotor in the axial direction, an attraction ring of magnetic material is located on the base plate opposite the rotor magnet in the axial direction. However, if the position of the rotor magnet in the axial direction is not constant along the circumferential direction, the attractive force of the attraction ring is varied, thereby varying the bearing performance. In addition, if the position of the rotor magnet in the axial direction is not constant along the circumferential direction, an inclined force is applied to the rotor. When the inclined force is changed according to the rotational phase, rotor vibrations are generated.

Consequently, in the conventional spindle motors, it is very important to reduce vibrations during the rotation by reducing the leakage flux from the yoke or stabilize the position of the rotor magnet in the axial direction.

In contrast, the yoke is cylindrical in the spindle motor disclosed in Unexamined Patent Publication 2004-263863, and the upper end of the rotor magnet is in contact with a projection of the nonmagnetic hub lower end. In this case, the degree of fringe magnetic field of the main pole at the radially inner portion of the rotor magnet shown in FIG. 12 attracted toward the yoke is decreased, and the degree of variation of the flux linkages to the stator core is decreased. However, the structure shown in the document has the following problems.

1) Since a motor structure of what is called in-hub type is employed, it is necessary to make the yoke thick to reduce the leakage flux to the disc positioned around the yoke. As a result, the outer diameter of the rotor magnet becomes smaller, so that electromagnetic conversion efficiency of the motor is extremely deteriorated and the motor current is increased.

2) Since a structure is employed in which a "groove-shaped" recess in cross section is formed at the deep bottom of a cup shape structure and the inner cylindrical surface of the yoke is bonded to the recess, it is necessary to use a form tool. In this case, as shown in FIG. 13(a), since nose R of a form tool 96 is shape-transferred to the inner circumference of a recess 535b of a hub 535, as shown in FIG. 13(b), it is necessary to form a large C-chamfering 533c on the upper surface of the radially inner portion of the yoke 533 to reliably fit the upper end of the yoke 533 into the recess 535b. Accordingly, the adhesion length between the yoke 533 and the recess 535b of the hub 535 is not enough, so that if a high impact is applied during the motor driving, the yoke 533 might come off. In addition, the form tool 96 needs to be repolished frequently if the number of products to be processed increases, thereby increasing the working cost.

3) In order to avoid the above-described problem, as shown in FIG. 14(a) and (b), it is necessary to prepare two kinds of cutting tools 97a and 97b to process the inner circumference 535c and the outer circumference 535d of the recess 535b, respectively, the tips of them being slender. Accordingly, at the process it is likely that chattering vibrations are generated in the cutting tools so that the machining accuracy is deteriorated or the surface roughness is developed, or burrs remain. As a result, it is expected that the concentricity will be deteriorated or the back yoke adhesion margin is deviated when the back yoke is bonded. If the remained burrs come off during the transportation or the operation, they might go between the disc and the head to damage the disc or destroy the device.

Furthermore, when the back yoke is fixed to the hub, it is necessary to use bonding or press-fit. The bonding entails problems such as the preparation of the clean oven and a large increase in the power during the production. The press-fitting entails problems such as the above-described machining accuracy and the burrs so that it is difficult to normally perform the press-fitting.

In conclusion, in the conventional spindle motors, it is very important to improve the electromagnetic conversion efficiency of motors, make it easy to process a yoke mounted on the hub, or reliably position the yoke and decrease the cost of manufacturing.

SUMMARY OF THE INVENTION

It is an object of the present invention to ensure the flatness of recording discs in a spindle motor.

It is another object of the present invention to reduce vibration during the rotation in a spindle motor.

It is further another object of the present invention to reduce the cost of manufacturing a spindle motor.

According to a first aspect of the present invention, a spindle motor for rotatably driving at least one recording disc comprises a base plate, a stator, a rotor hub, a yoke, a rotor magnet, and a hydrodynamic bearing. The stator is provided on the base plate. The rotor hub is a member to which the recording disc is attached. The yoke is an annular member provided on the rotor hub. The rotor magnet is an annular member provided on the yoke and located on a outer circumference side of the stator to be opposite the stator in the radial direction. The hydrodynamic bearing is provided on the base plate for rotatably supporting the rotor hub relative to the base plate. The rotor hub includes a disc support cylindrical portion for supporting the recording disc in the radial direction, an annular disc mount portion formed around an outer circumference of the disc support cylindrical portion for mounting the recording disc thereon, and an annular projection formed on the axially opposite side of the recording disc and having an outer circumference to which the yoke is fixed The disc mount portion is formed with an annular non-contact surface near the recording disc in the axial direction, and an annular disc receiving face around an outer circumference of the non-contact surface and nearer to the recording disc than the non-contact surface in the axial direction for being in contact with the recording disc in the axial direction. The outer diameter of the annular projection is smaller than the outer diameter of the non-contact surface.

In the spindle motor, since the outer diameter of the annular projection is smaller than the outer diameter of the non-contact surface, the annular projection is reliably formed on the radially inner portion of the disc receiving face. As a result, the axial dimension of the radially inner portion of the disc mount portion increases, so that the strength of the radially inner portion of the disc mount portion can be improved. Furthermore, when the yoke is press-fitted around the annular projection, the axial load is applied to the disc mount portion. However, since the non-contact surface formed radially inward of the disc receiving face is supported when the yoke is press-fitted, the point of application of the load is positioned within a supported area, the axial load applied to the disc mount portion can be reliably received by the jig. Furthermore, since the distance between the annular projection and the disc support cylindrical portion becomes smaller, the bending moment itself applied to the radially inner portion of the disc mount portion becomes smaller when the yoke is press-fitted, too. In other words, it is possible to prevent the bending moment from being applied to the radially inner portion of the disc mount portion when the yoke is press-fitted. Consequently, it is possible to prevent the deformation of the disc mount portion when the yoke is press-fitted or the recording discs are clamped, thereby maintaining the flatness of the recording discs.

In addition, since the deformation of the disc mount portion is prevented, it is unnecessary to process the disc receiving face after the yoke is press-fitted in order to ensure the flatness of the disc receiving face, thereby reducing the cost of manufacturing.

A spindle motor according to a second aspect of the present invention is the spindle motor of the first aspect, wherein the outer diameter of the annular projection is larger than the outer diameter of the disc support cylindrical portion.

In the spindle motor, since the outer diameter of the annular projection is larger than the outer diameter of the disc support cylindrical portion, the radially outer portion of the annular projection is reliably located within a range of the non-contact surface. As a result, by supporting the non-contact surface with the jig when the yoke is press-fitted, the axial load applied to the disc mount portion can be reliably received by the jig. Consequently, in the manufacturing process, it is possible to more reliably prevent the bending moment from being applied to the radially inner portion of the disc mount portion, so that the deformation of the disc mount portion can be reliably prevented when the yoke is press-fitted.

Since the diameter of the rotor magnet can be larger compared to the motor structure of in-hub type, it is possible to improve the electromagnetic conversion efficiency to reduce the consumption power.

Furthermore, since a portion to which the yoke is attached is the lower open end of the hub, it is possible to employ a simple cutting tool in a shape without using form tools, thereby reducing the working cost.

A spindle motor according to a third aspect of the present invention is the spindle motor of the first aspect further comprises an annular reinforcing flange formed around the outer circumference of the disc mount portion.

In the spindle motor, since the reinforcing flange further improves the strength of the disc mount portion, it is possible to more reliably prevent the deformation of the disc mount portion when the yoke is press-fitted or the recording discs are clamped.

According to a fourth aspect of the present invention, a spindle motor for rotatably driving at least one recording disc comprises a base plate, a stator, a rotor hub, a yoke, a rotor magnet, and a hydrodynamic bearing. The stator is provided on the base plate. The rotor hub is a member to which the recording disc is attached. The yoke is an annular member provided on the rotor hub. The rotor magnet is an annular member provided on the yoke and located on a outer circumference side of the stator to be opposite the stator in the radial direction. The hydrodynamic bearing is provided on the base plate for rotatably supporting the rotor hub relative to the base plate. The rotor hub includes a disc support cylindrical portion for supporting the recording disc in the radial direction, an annular disc mount portion formed around an outer circumference of the disc support cylindrical portion for mounting the recording disc thereon, and an annular projection formed on the axially opposite side of the recording disc and having an outer circumference to which the yoke is fixed, and an annular reinforcing flange formed around an outer circumference of the disc mount portion.

In the spindle motor, since the reinforcing flange is formed on the outer circumference of the disc mount portion, it is possible to improve the strength of the disc mount portion. Consequently, it is possible to prevent the deformation of the disc mount portion when the yoke is press-fitted or the recording discs are clamped, thereby maintaining the flatness of the recording discs.

A spindle motor according to a fifth aspect of the present invention is the spindle motor of the fourth aspect, wherein the reinforcing flange does not protrude from the disc mount portion in the axial direction.

In the spindle motor, since the reinforcing flange does not protrude from the disc mount portion in the axial direction, it is possible to locate a working tool radially outward of the annular projection when the outer circumferential surface of the annular projection is processed. In other words, it is unnecessary to use the slender working tool in the axial direction. As a result, it is possible to reduce the vibration generated during the processing due to the slender working tool, so that the machining accuracy can be ensured. Consequently, the centering accuracy between the rotor hub, the yoke, and the rotor magnet is ensured, thereby ensuring the flatness of the recording discs.

A spindle motor according to a sixth aspect of the present invention is the spindle motor of the fourth aspect, wherein the reinforcing flange does not protrude from the disc mount portion toward the recording disc in the axial direction, and protrudes from the disc mount portion in the axially opposite direction to the recording disc.

In the spindle motor, since the reinforcing flange protrudes from the disc mount portion in the axially opposite direction to the recording disc, the thickness of the reinforcing flange can be set larger than the disc mount portion. Consequently, the strength of the disc mount portion can be further improved.

A spindle motor according to a seventh aspect of the present invention is the spindle motor of the fourth aspect, wherein a first gap is defined between the reinforcing flange and the yoke in the radial direction.

In the spindle motor, since the first gap is defined between the reinforcing flange and the yoke in the radial direction, even if the adhesive is squeezed out of the yoke when the yoke is bonded to the annular projection, there is no possibility that the yoke and the reinforcing flange are bonded to each other by the adhesive. Consequently, it is possible to reduce the deformation of the disc mount portion and the reinforcing flange due to the adhesive. Furthermore, since a portion to which the yoke is attached is the lower open end of the hub, it is possible to employ a simple cutting tool in a shape without using form tools, thereby reducing the working cost.

A spindle motor according to an eighth aspect of the present invention is the spindle motor of the fourth aspect, wherein the base plate is formed with an annular recess for accommodating the reinforcing flange.

In the spindle motor, since the reinforcing flange is accommodated in the recess in the base plate, the reinforcing flange and the recess form a labyrinth structure therebetween. As a result, it is possible to partition an area requiring cleanliness for the recording discs off an area in which the rotor magnet and the stator are accommodated by the reinforcing flange and the recess. Consequently, it is possible to reduce the amount of the out gas or the like generated from the adhesive for fixation leaking into the area accommodating the recording disc, thereby maintaining cleanliness in the area accommodating the recording discs.

According to a ninth aspect of the present invention, a spindle motor for rotatably driving at least one recording disc comprises a base plate, a stator, a rotor hub, a yoke, a rotor magnet, and a hydrodynamic bearing. The stator is provided on the base plate. The rotor hub is a member to which the recording disc is attached. The yoke is an annular member provided on the rotor hub. The rotor magnet is an annular member provided on the yoke and located on a outer circumference side of the stator to be opposite the stator in the radial direction. The hydrodynamic bearing is provided on the base plate for rotatably supporting the rotor hub relative to the base plate. The rotor hub includes a disc support cylindrical portion for supporting the recording disc in the radial direction, an annular disc mount portion formed around an outer circumference of the disc support cylindrical portion for mounting the recording disc thereon, and an annular projection formed on the axially opposite side of the recording disc and having an outer circumference to which the yoke is fixed. The yoke includes a tubular yoke main body extending in the axial direction and having an inner circumference to which the rotor magnet is fixed, and an annular fixing part extending from an end of the yoke main body radially inward and fixed to the outer circumference of the annular projection. A second gap is defined between the fixing part and the rotor magnet in the axial direction.

In the spindle motor, since the second gap is defined between the fixing part of the yoke and the rotor magnet in the axial direction, it is possible to reduce the leakage flux from the rotor magnet to the recording disc, thereby reducing the vibrations of the rotor hub when rotating. Furthermore, it is possible to reduce variations of the attraction force due to the variations of the axial dimension of the rotor magnet, thereby reducing the vibration of the rotor hub when rotating. Even if the inner portion of a joint between the yoke main body and the fixing part is formed to be round, it is unnecessary to chamfer the radially outer end of the rotor magnet, thereby reducing the cost of manufacturing.

A spindle motor according to a tenth aspect of the present invention is the spindle motor of the ninth aspect, wherein the axial thickness of the fixing part of the yoke is smaller than the axial dimension of the annular projection. The rotor magnet is in contact with the annular projection in the axial direction.

In the spindle motor, since the axial thickness of the fixing part is smaller than the axial dimension of the annular projection, the second gap can be reliably ensured while the rotor magnet is in contact with the annular projection in the axial direction.

A spindle motor according to an eleventh aspect of the present invention is the spindle motor of the ninth aspect, wherein only the inner circumferential edge of the fixing part is in contact with the disc mount portion in the axial direction.

In the spindle motor, only the inner circumferential edge of the fixing part is in contact with the disc mount portion in the axial direction. In other words, portions of the fixing part other than the inner circumferential edge is not in contact with the disc mount portion. Accordingly, the yoke can be positioned in the axial direction by the inner circumferential edge of the fixing part, so that portions of the end face other than the inner circumferential edge do not require the flatness. Consequently, it is unnecessary to process the end face of the yoke improve the flatness, thereby reducing the cost of manufacturing.

According to a twelfth aspect of the present invention, a spindle motor for rotatably driving at least one recording disc comprises a base plate, a stator, a rotor hub, a yoke, a rotor magnet, and a hydrodynamic bearing. The stator is provided on the base plate. The rotor hub is a member to which the recording disc is attached. The yoke is an annular member provided on the rotor hub. The rotor magnet is an annular member provided on the yoke and located on a outer circumference side of the stator to be opposite the stator in the radial direction. The hydrodynamic bearing is provided on the base plate for rotatably supporting the rotor hub relative to the base plate. The rotor hub includes a disc support cylindrical portion for supporting the recording disc in the radial direction, an annular disc mount portion formed around an outer circumference of the disc support cylindrical portion for mounting the recording disc thereon, and an annular projection formed on the axially opposite side of the recording disc and having an outer circumference to which the yoke is fixed. The yoke includes a tubular yoke main body extending in the axial direction, and an annular fixing part extending from an axial end of the yoke main body radially inward and fixed to the outer circumference of the annular projection. Only an inner circumferential edge of the fixing part is in contact with the disc mount portion in the axial direction.

In the spindle motor, only the inner circumferential edge of the fixing part is in contact with the disc mount portion in the axial direction. In other words, portions of the fixing part other than the inner circumferential edge are not in contact with the disc mount portion. Accordingly, the yoke can be positioned in the axial direction by the inner circumferential edge of the fixing part, so that portions of the end face other than the inner circumferential edge do not require the flatness. Consequently, it is unnecessary to process the end face of the yoke in order to improve the flatness, thereby reducing the cost of manufacturing.

A spindle motor according to a thirteenth aspect of the present invention is the spindle motor of the twelfth aspect, wherein the yoke is further formed with an inclined surface that is formed on an end of the fixing part near the recording disc in the axial direction and is inclined in the axially opposite direction to the recording disc as radially outward.

In the spindle motor, since the yoke has the inclined surface, only the inner circumferential edge of the fixing part can reliably get into contact with the disc mount portion.

A spindle motor according to a fourteenth aspect of the present invention is the spindle motor of the twelfth aspect, wherein the disc mount portion is further formed with an inclined surface on a side thereof in the axially opposite direction to the recording disc that is inclined toward the recording disc in the axial direction as radially outward.

In the spindle motor, since the disc mount portion has the inclined surface, only the inner circumferential edge of the yoke can reliably get into contact with the disc mount portion.

According to a fifteenth aspect of the present invention, a method of manufacturing a spindle motor for rotatably driving at least one recording disc comprising a base plate, a stator, a rotor hub, a yoke, a rotor magnet, and a hydrodynamic bearing is provided. The stator is provided on the base plate. The rotor hub is a member to which the recording disc is attached. The yoke is an annular member provided on the rotor hub. The rotor magnet is an annular member provided on the yoke and located on a outer circumference side of the stator to be opposite the stator in the radial direction. The hydrodynamic bearing is provided on the base plate for rotatably supporting the rotor hub relative to the base plate. The method includes manufacturing the base plate, the stator, the rotor hub, the yoke, the rotor magnet, and the hydrodynamic bearing, assembling the yoke to the rotor hub, assembling the rotor magnet to the rotor hub, and assembling the stator, the rotor, and the hydrodynamic bearing to the base plate.

The rotor hub includes a disc support cylindrical portion, an annular disc mount portion formed around an outer circumference of the disc support cylindrical portion for mounting the recording disc thereon, and an annular projection formed on the axially opposite side of the recording disc and having an outer circumference to which the yoke is fixed. The disc mount portion is formed with an annular non-contact surface near the recording disc in the axial direction, and an annular disc receiving face around an outer circumference of the non-contact surface and nearer to the recording disc than the non-contact surface in the axial direction for being in contact with the recording disc in the axial direction.

The assembling the yoke to the rotor hub further includes setting and press-fitting. In the setting process, the rotor hub is set into a jig having an axially extending annular support portion such that the non-contact surface gets into contact with the annular support portion in the axial direction. In the press-fitted process, the yoke is press-fitted around the outer circumference of the annular projection.

In the manufacturing method, since the non-contact surface is supported by the annular support portion of the jig in the setting process, the axial load applied to the disc mount portion can be reliably received by the jig in the yoke assembling process, thereby preventing the bending moment from being applied to the radially inner portion of the disc mount portion. As a result, the deformation of the disc mount portion can be prevented when the yoke is press-fitted, and it is unnecessary to process the disc receiving face after the yoke is press-fitted in order to ensure the flatness of the disc receiving face. Consequently, in the manufacturing method, it is possible to reduce the cost of manufacturing spindle motors.

A method of manufacturing a spindle motor according to a sixteenth aspect of the present invention is the method of the fifteenth aspect, wherein the outer diameter of the annular projection is smaller than the outer diameter of the non-contact surface.

In the manufacturing method, since the outer diameter of the annular projection is smaller than the outer diameter of the non-contact surface, the point of application of the load is positioned within the non-contact surface when the yoke is press-fitted, the axial load applied to the disc mount portion can be reliably supported by the annular support portion of the jig. Furthermore, since the distance between the annular projection and the disc support cylindrical portion becomes smaller, the bending moment itself applied to the radially inner portion of the disc mount portion becomes smaller when the yoke is press-fitted, too. In other words, it is possible to prevent the bending moment from being applied to the radially inner portion of the disc mount portion when the yoke is press-fitted. Consequently, the deformation of the disc mount portion can be prevented when the yoke is press-fitted, thereby maintaining the flatness of the recording disc.

Since the deformation of the disc mount portion can be prevented, it is unnecessary to process the disc receiving face after the yoke is press-fitted in order to ensure the flatness of the disc receiving face. Consequently, it is possible to reduce the cost of manufacturing.

A method of manufacturing a spindle motor according to a seventeenth aspect of the present invention is the method of the fifteenth aspect, wherein the jig is formed with a support hole into which the disc support cylindrical portion can be attached in the axial direction. In the setting process, the rotor hub is set into the jig such that the disc support cylindrical portion is inserted into the support hole.

In the manufacturing method, since the disc support cylindrical portion is fitted into the support hole in the setting process, it is easy to center the rotor hub relative to jig. Consequently, it is possible to reliably center the non-contact surface of rotor hub relative to the annular support portion of the jig, thereby reliably supporting the non-contact surface by the annular support portion.

According to an eighteenth aspect of the present invention, a recording and reproducing apparatus comprises the spindle motor according to the first aspect, the recording disc attached to the rotor hub for recording information thereon, and an information access means for writing or reading information into or from certain positions in the recording disc.

In the recording and reproducing apparatus, since the spindle motor according to the first aspect of the present invention is provided, it is possible to maintain the flatness of the recording disc, thereby stabilizing recording and reproducing operations. In addition, in the recording and reproducing apparatus, since the spindle motor according to the first aspect of the present invention is provided, it is possible to reduce the cost of manufacturing.

According to an nineteenth aspect of the present invention, a recording and reproducing apparatus comprises the spindle motor according to the fourth aspect, the recording disc attached to the rotor hub for recording information thereon, and an information access means for writing or reading information into or from certain positions in the recording disc.

In the recording and reproducing apparatus, since the spindle motor according to the fourth aspect of the present invention is provided, it is possible to maintain the flatness of the recording disc, thereby stabilizing recording and reproducing operations.

According to a twentieth aspect of the present invention, a recording and reproducing apparatus comprises the spindle motor according to the ninth aspect, the recording disc attached to the rotor hub for recording information thereon, and an information access means for writing or reading information into or from certain positions in the recording disc.

In the recording and reproducing apparatus, since the spindle motor according to the ninth aspect of the present invention is provided, it is possible to maintain the flatness of the recording disc, thereby stabilizing recording and reproducing operations.

According to a twenty-first aspect of the present invention, a recording and reproducing apparatus comprises the spindle motor according to the twelfth aspect, the recording disc attached to the rotor hub for recording information thereon, and an information access means for writing or reading information into or from certain positions in the recording disc.

In the recording and reproducing apparatus, since the spindle motor according to the twelfth aspect of the present invention is provided, it is possible to maintain the flatness of the recording disc, thereby stabilizing recording and reproducing operations.

BRIEF DESCRIPTION OF THE DRAWINGS

Referring now to the attached drawings which form a part of this original disclosure:

FIG. 10 is a longitudinal cross-sectional schematic diagram of a recording and reproducing apparatus into which the spindle motor 1 according to the present invention is installed.

FIGS. 13A and 13B are explanatory views of the conventional method of processing the rotor hub and the bonding step of the yoke.

FIGS. 14A and 14B are explanatory views of the conventional method of processing a rotor hub.

DETAILED DESCRIPTION OF THE INVENTION

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

A description will be made on embodiments of the present invention with reference to figures.

Figure 1:
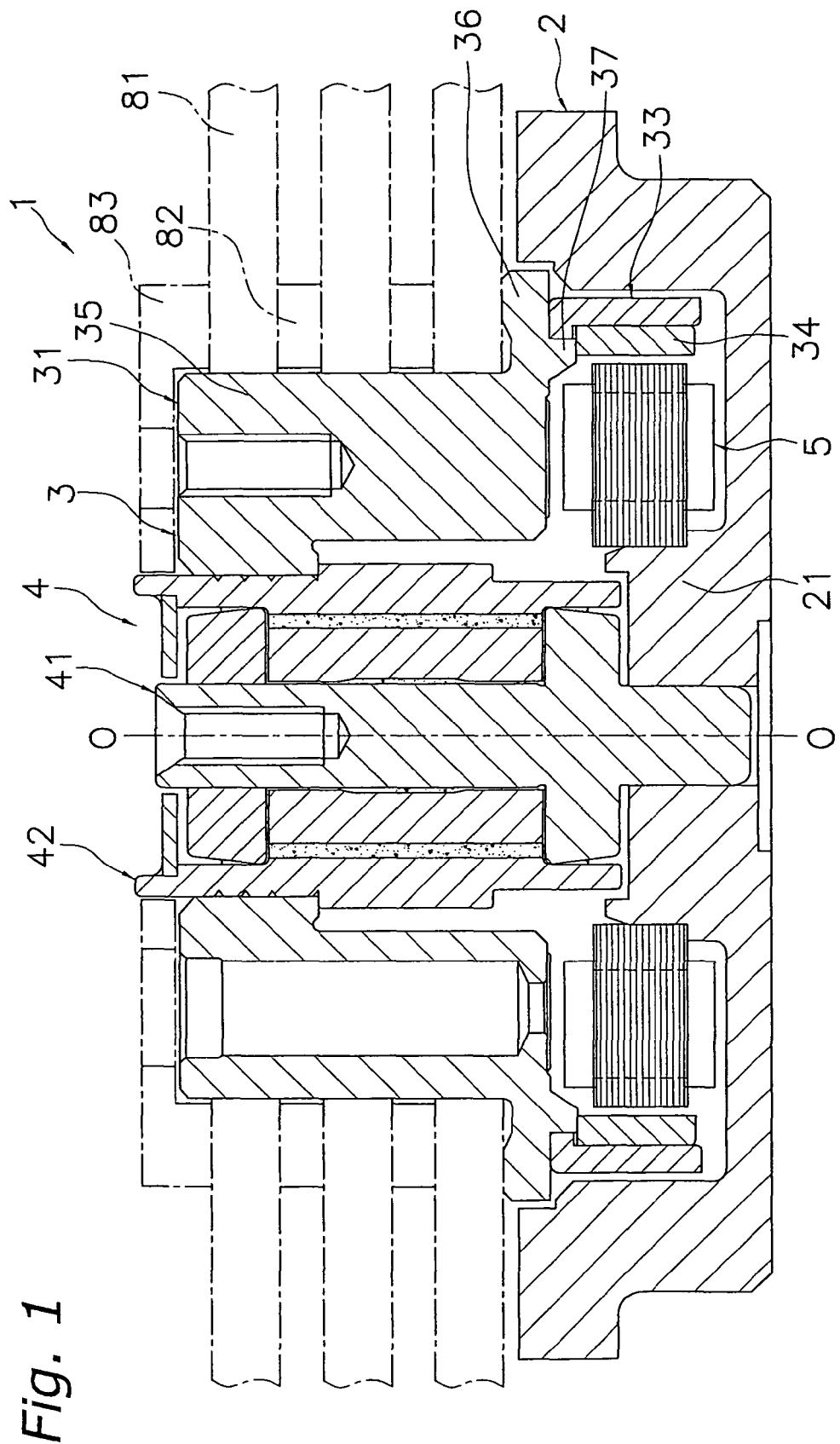
FIG. 1 is a longitudinal cross-sectional schematic diagram of the spindle motor 1 in the first embodiment according to the present invention.

FIG. 1 shows a longitudinal cross sectional schematic diagram of a spindle motor 1 according to the first embodiment of the present invention. O-O shown in FIG. 1 represents the axis of rotation of the spindle motor 1. It should be noted that vertical directions in the figures are expressed as "upward in the axial direction" and "downward in the axial direction" for convenience in the explanation of the present embodiment, but they do not limit the actual attachment state of the spindle motor 1.

The spindle motor 1 mainly comprises a base plate 2, a stator 5, a hydrodynamic bearing 4, and a rotor 3. Details of each component will be described below.

The base plate 2 constitutes a static portion of the spindle motor 1, and is fixed to a housing (not illustrated) of the recording disc device, for example. The base plate 2 has a tubular portion 21 having an inner circumference to which one end of a shaft 41 of the hydrodynamic bearing 4 (later described) is fixed. The stator 5 constitutes a magnetic circuit with a rotor magnet 34 and a yoke 33 (later described), and is fixed to the outer circumference of the tubular portion 21.

The rotor 3 constitutes a rotary member of the spindle motor 1, and is rotatably driven by the turning force generated in the magnetic circuit. More specifically, the rotor 3 includes a rotor hub 31 of non-magnetic materials, a yoke 33 of magnetic materials, and a rotor magnet 34. The rotor hub 31 is a member onto which the recording discs 81 are mounted, and is fixed to the outer circumference of a sleeve 42 (later described) by adhesive or the like. The yoke 33 is an annular member located under the rotor hub 31 in the axial direction, and is fixed to the outer circumference of an annular projection 37 (later described). The rotor magnet 34 is an annular member located radially outward of and radially opposite the stator 5, and is fixed to the inner circumference of the yoke 33. The stator 5, the yoke 33, and the rotor magnet 34 constitute the magnetic circuit to rotatably drive the rotor 3. The driving force in the rotational direction generated by the magnetic circuit rotatably drives the rotor 3 relative to the base plate 2 and the stator 5. The rotor 3 will be described in detail later.

Figure 2:
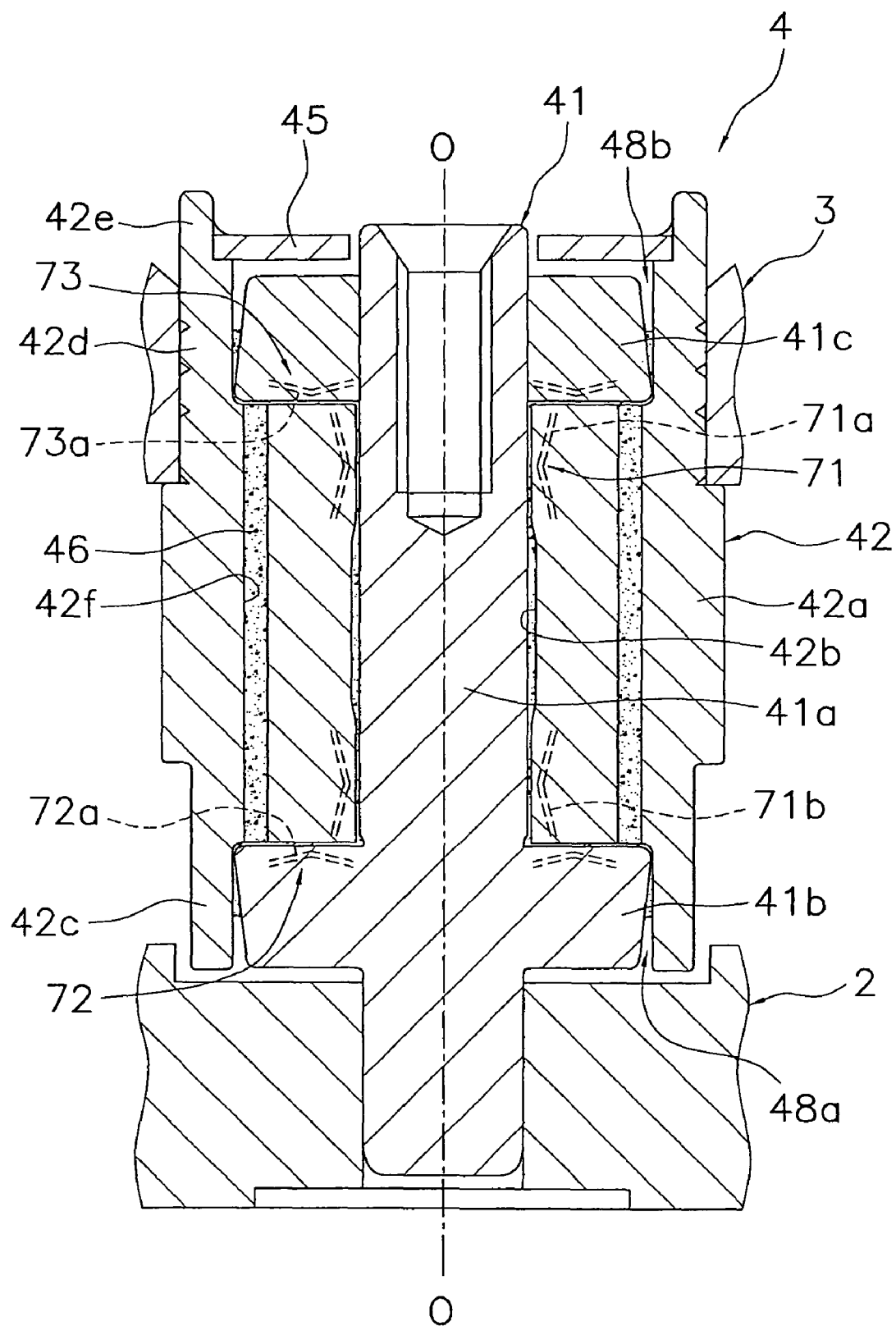
FIG. 2 is a view of a longitudinal cross-sectional schematic diagram of the hydrodynamic bearing 4.

The hydrodynamic bearing 4 is a structure to rotatably support the rotor 3 relative to the base plate 2, and comprises a sleeve 42 and a shaft 41. FIG. 2 shows a longitudinal cross sectional schematic diagram of the hydrodynamic bearing 4.

The sleeve 42 is a rotary member in the hydrodynamic bearing 4, and is a tubular member located rotatably relative to the shaft 41 (later described). More specifically, the sleeve 42 comprises, as shown in FIG. 2, a sleeve main body 42a, a plurality of first hydrodynamic grooves 71a and 71b, a recess 42b, a first tubular projection 42c, a second tubular projection 42d, a third tubular projection 42e, and a plurality of communication holes 42f.

The sleeve main body 42a is a tubular portion constituting a main part of the sleeve 42. The first hydrodynamic grooves 71a and 71b are grooves formed on the inner circumferential surface of the sleeve main body 42a and arranged equidistantly in the circumferential direction. The grooves are herringbone in shape, for example. The recess 42b is an annular recessed portion formed on the inner circumference of the sleeve main body 42a, and is located between the first hydrodynamic grooves 71a and 71b in the axial direction.

The first and second tubular projections 42c and 42d are tubular portions extending in the axial direction from the outer circumferences of both ends of the sleeve main body 42a. Since first and second thrust flanges 41b and 41c (later described) are located radially inward of the first and second tubular projections 42c and 42d, respectively, the inner diameters of the first and second tubular projections 42c and 42d are set to be larger than the inner diameter of the sleeve main body 42a. The third tubular projection 42e is a tubular portion extending upward in the axial direction from the end of the second tubular projection 42d. The inner diameter of the third tubular projection 42e is set to be larger than the inner diameter of the second tubular projection 42d, and a cover 45 is fixed to the inner circumference of the third tubular projection 42e by adhesive or the like. The communication holes 42f penetrate the sleeve main body 42a in the axial direction, and are located equidistantly in the circumferential direction, for example.

The shaft 41 is a fixed member in the hydrodynamic bearing 4, and has a lower end in the axial direction fixed to the tubular portion 21 of the base plate 2. The shaft 41 has a shaft main body 41a, a first thrust flange 41b, and a second thrust flange 41c. The shaft main body 41a is a cylindrical member constituting a main part of the shaft 41, and is located radially inward of the sleeve main body 42a with a micro-clearance therebetween. The first thrust flange 41b is an annular portion molded integrally with the shaft main body 41a, for example, and is located radially inward of the first tubular projection 42c such that the flange 41b is opposed to the lower end surface in the axial direction of the sleeve main body 42a with a micro-clearance in the axial direction. The second thrust flange 41c is an annular member located on a side of the sleeve main body 42a in the axially opposite direction to the first thrust flange 41b, and is fixed to the shaft main body 41a by welding or the like, for example. The second thrust flange 41c is located radially inward of the second tubular projection 42d such that the flange 41c is opposed to the upper end surface in the axial direction of the sleeve main body 42a with a micro-clearance in the axial direction. The first and second thrust flanges 41b and 41c have surfaces opposite the end surfaces of the sleeve main body 42a on which second and third hydrodynamic grooves 72a and 73a are formed. The second and third hydrodynamic grooves 72a and 73a are spiral or herringbone in shape, for example. The second and third hydrodynamic grooves 72a and 73a may be formed on the sleeve main body 42a.

The first and second thrust flanges 41b and 41c have radially outer tapered portions. More specifically, the radially outer surfaces of the first and second thrust flanges 41b and 41c are inclined in a direction opposite to the inner circumference of the first and second tubular projections 42c and 42d as upward and downward in the axial direction. Between the sleeve 42 and the shaft 41 is filled lubricating oil 46 as a working fluid. Between the first thrust flange 41b and the first tubular projection 42c, and between the second thrust flange 41c and the second tubular projection 42d are formed tapered seal portions 48a and 48b, respectively. As described above, the hydrodynamic bearing 4 shown in FIG. 2 is a hydrodynamic bearing of both end open type in which the sleeve 42 has both open ends. The hydrodynamic bearing 4 is a hydrodynamic bearing of shaft-fixed type in which the shaft 41 is fixed.

In the hydrodynamic bearing 4, the sleeve 42 having the first hydrodynamic grooves 71a and 71b, the shaft 41, and the lubricating oil 46 therebetween constitute a radial bearing 71 to support the rotor 3 in the radial direction. The first thrust flange 41b having the second hydrodynamic groove 72a, the sleeve 42, and the lubricating oil 46 therebetween constitute a first thrust bearing 72 to support the rotor 3 in the axial direction. The second thrust flange 41c having the third hydrodynamic groove 73a, the sleeve 42, and the lubricating oil 46 therebetween constitute a second thrust bearing 73 to support the rotor 3 in the axial direction. When each of the members is rotated relatively, bearing powers are generated to support the shaft 41 in the radial and axial directions at the bearings 71, 72, and 73.

As described above, in the spindle motor 1, the rotor 3 is rotatably supported by the base plate 2 and the stator 5 via the hydrodynamic bearing 4, and the recording discs 81 are rotatably driven together with the rotor 3 when the stator 5 is energized.

Figure 3:
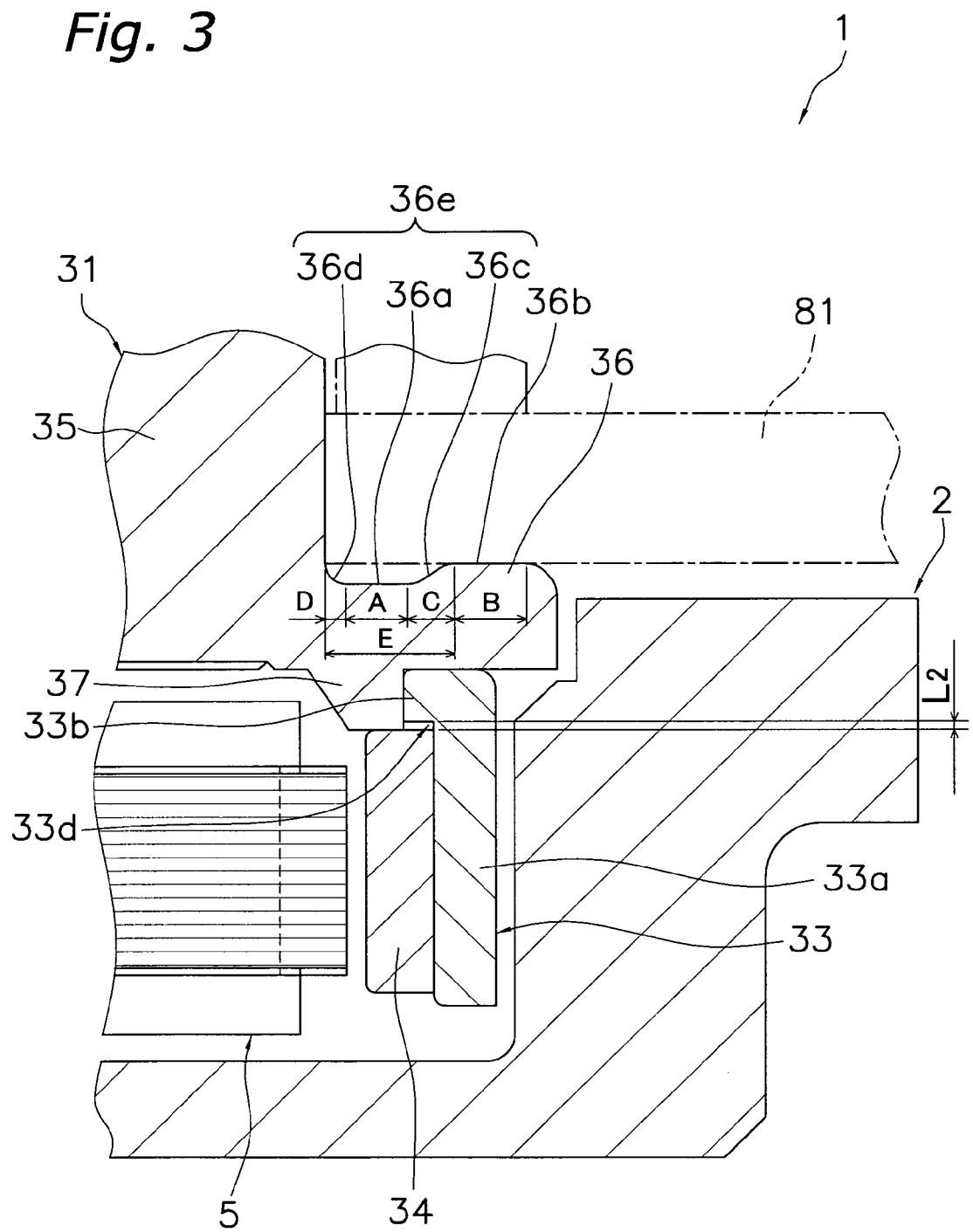
FIG. 3 is a fragmentary sectional view of a portion around the rotor hub 31.

Here, the rotor hub 31 of the rotor 3 will be described in detail. FIG. 3 shows a fragmentary sectional view of the rotor hub 31. As shown in FIG. 1, the rotor hub 31 has a disc support cylindrical portion 35, a disc mount portion 36, and an annular projection 37. The disc support cylindrical portion 35 is a tubular portion to support the recording discs 81 in the radial direction, and is fixed to the outer circumference of the sleeve 42. As shown in FIG. 3, the disc mount portion 36 is an annular portion to mount the recording discs thereon, and is formed on the outer circumference of the lower end in the axial direction of the disc support cylindrical portion 35. The annular projection 37 is an annular portion formed on a lower side of the disc mount portion 36 in the axial direction (in the opposite direction to the recording discs), and extends from the disc mount portion 36 downward in the axial direction. The disc mount portion 36 is formed with a non-contact surface 36e and an annular disc receiving face 36b. In FIG. 3, areas of the non-contact surface 36e and the disc receiving face 36b are represented by E and B, respectively. The non-contact surface 36e is an annular recess formed on the upper portion in the axial direction of the disc mount portion 36, and is formed on a radially inner portion of the disc mount portion 36 and radially outward of the disc support cylindrical portion 35. The non-contact surface 36e is made up of a corner flat portion 36a, a stepped portion 36c, and a corner R portion 36d, which are indicated by A, C, and D, respectively, in FIG. 3. The disc receiving face 36b is a surface in contact with the recording disc 81 in the axial direction, and is an annular plane at the upper portion in the axial direction of the disc mount portion 36. The disc receiving face 36b is formed radially outward of the non-contact surface 36e and upward of the non-contact surface 36e in the axial direction. In other words, a portion where the disc receiving face 36b is formed projects upward in the axial direction beyond a portion where the non-contact surface 36e is formed.

As shown in FIG. 1, three recording discs 81 are fitted around the outer circumference of the disc support cylindrical portion 35. As examples of the recording discs 81, for example, magnetic discs or the like can be used for recording and reproducing the information by an information access means (not illustrated). Between the recording discs 81 in the axial direction are disposed spacers 82 to keep the distances between the recording discs 81 constant. The recording discs 81 and the spacers 82 are sandwiched and fixed to each other between a damper 83 fixed to the rotor hub 31 and the disc mount portion 36. In other words, the recording discs 81 are positioned in the axial direction by the disc receiving face 36b. The outer diameter of the annular projection 37 is set to be smaller than the outer diameter of the non-contact surface 36e. The outer diameter of the annular projection 37 is set to be larger than the outer diameter of the disc support cylindrical portion 35.

In the spindle motor 1, since the outer diameter of the annular projection 37 is smaller than the outer diameter of the non-contact surface 36e, and than the outer diameter of the corner flat portion 36a, the annular projection 37 can be reliably formed radially inward of the disc receiving face 36b. As a result, the axial dimension of the radially inner portion of the disc mount portion 36 becomes large, so that strength of the radially inner portion of the disc mount portion 36 can be improved. Furthermore, although the axial load is applied to the disc mount portion 36 when the yoke 33 is press-fitted around the annular projection 37, by supporting the non-contact surface 36e formed radially inward of the disc receiving face 36b when the yoke 33 is press-fitted, a point of application of the load can be within a supported range, thereby reliably supporting the axial load applied to the disc mount portion 36 by the jig. It is preferable to support the corner flat portion 36a among the non-contact surface 36e. Furthermore, since the distance between the annular projection 37 and the disc support cylindrical portion 35 becomes short, a bending moment itself applied to the radially inner portion of the disc mount portion 36 becomes smaller when the yoke 33 is press-fitted. In other words, it is possible to prevent the bending moment from being applied to the radially inner portion of the disc mount portion 36 when the yoke 33 is press-fitted. Consequently, it is possible to prevent the deformation of the disc mount portion 36 when the yoke 33 is press-fitted to maintain the flatness of the recording discs 81.

Since it is possible to prevent the deformation of the disc mount portion 36, it is unnecessary to process the disc receiving face 36b to ensure the flatness of the disc receiving face 36b after the yoke 33 is press-fitted. Consequently, the cost of manufacturing can be lowered.

In this spindle motor 1, since the outer diameter of the annular projection 37 is larger than the outer diameter of the disc support cylindrical portion 35, the radially outer portion of the annular projection 37 can be reliably located within a range of the non-contact surface 36e. As a result, by supporting the non-contact surface 36e with the jig when the yoke 33 is press-fitted, it is possible to reliably support the axial load applied to the disc mount portion 36 with the jig. In other words, only the compressive force in the axial direction is applied to the disc mount portion 36 and the bending moment is not applied unlike the conventional arts. Consequently, it is possible to reliably prevent the bending moment from being applied to the radially inner portion of the disc mount portion 36, and prevent the disc mount portion 36 from being deformed when the yoke 33 is press-fitted.

As shown in FIG. 3, the yoke 33 has a yoke main body 33a and a fixing part 33b. The yoke main body 33a is a tubular portion extending in the axial direction, and constitutes a main part of the yoke 33. The rotor magnet 34 is fixed to the inner circumference of the yoke main body 33a by adhesive or the like, for example. The fixing part 33b is an annular portion extending radially inward from the end of the yoke main body 33a, and is fixed to the outer circumference of the annular projection 37 by press-fitting. The yoke 33 is formed by press working one plate-like member, for example. The yoke 33 has an L shape in cross section seen in the circumferential direction constituted by the yoke main body 33a and the fixing part 33b.

As shown in FIG. 3, the axial thickness of the fixing part 33b is set to be smaller than the axial dimension of the annular projection 37. The rotor magnet 34 is in contact with the annular projection 37 in the axial direction. In other words, between the fixing part 33b and the rotor magnet 34 in the axial direction is defined a gap L2 (second gap) along the entire circumference.

In the spindle motor 1, since the gap L2 is defined between the fixing part 33b of the yoke 33 and the rotor magnet 34 in the axial direction, it is possible to reduce leakage flux flowing out of the rotor magnet 34 toward the recording discs 81, thereby reducing the vibration when the rotor 3 is rotated. Furthermore, it is possible to reduce the variation of the attraction force applied to the rotor magnet 34 toward the base plate 2 due to the variation of the axial dimension of the rotor magnet 34, thereby reducing the rotational vibration of the rotor 3. Furthermore, even if an inner portion 33d of a joint between the yoke main body 33a and the fixing part 33b is formed to be round, it is unnecessary to chamfer the radially outer portion of the end of the rotor magnet 34, thereby reducing the cost of manufacturing. Taking R of the inner portion 33d into account, the gap L2 is preferably 50 micrometers or more, and further taking into account the magnetic fringing effect, the gap L2 is preferably 100 micrometers or more.

In the spindle motor 1, since the axial thickness of the fixing part 33b is smaller than the axial dimension of the annular projection 37, it is possible to reliably ensure the gap L2 while the rotor magnet 34 being in contact with the annular projection 37 in the axial direction. It is also easy to position the rotor magnet 34 during the manufacturing process, thereby improving the operating efficiency during the manufacturing process.

Alternate Embodiments

Alternate embodiments will now be explained. In view of the similarity between the first and alternate embodiments, the parts of the alternate embodiment that are identical to the parts of the first embodiment will be given the same reference numerals as the parts of the first embodiment. Moreover, the descriptions of the parts of the alternate embodiment that are identical to the parts of the first embodiment may be omitted for the sake of brevity.

Second Embodiment

The spindle motor 1 as the above-described first embodiment is characterized in the positional relationship between the non-contact surface 36e of the disc mount portion 36 and the annular projection 37, but the present invention is not limited to this embodiment.

Figure 4:
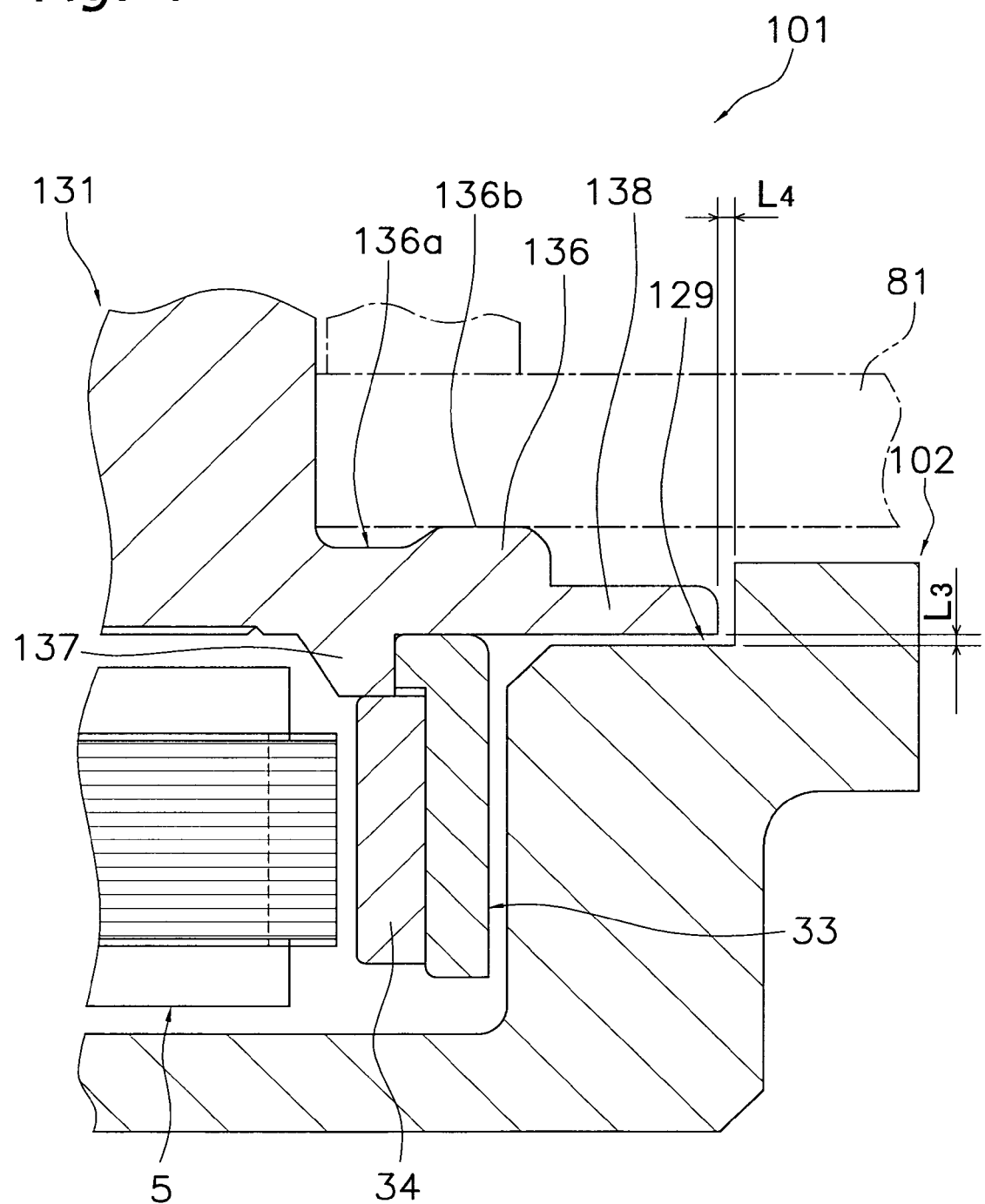
FIG. 4 is a fragmentary sectional view of a portion around the rotor hub 131 in the second embodiment according to the present invention.

FIG. 4 is a fragmentary sectional view of a portion of a spindle motor 101 around a rotor hub 131 in the second embodiment of the present invention. In FIG. 4, components similar to those in the first embodiment are indicated by the same reference marks.

As shown in FIG. 4, the rotor hub 131 in the second embodiment further has an annular reinforcing flange 138 formed around the outer circumference of a disc mount portion 136. In the present embodiment, an annular plane is formed on the lower surfaces of the reinforcing flange 138 and the disc mount portion 136 in the axial direction. In other words, the lower surfaces in the axial direction of the reinforcing flange 138 and the disc mount portion 136 have the same position in the axial direction. The upper surface in the axial direction of the reinforcing flange 138 is located below a disc receiving face 136b of the disc mount portion 136 in the axial direction. Consequently, in the present embodiment, it is possible to say the reinforcing flange 138 does not protrude from the disc mount portion 136 in the axial direction. The under surface in the axial direction of the reinforcing flange 138 may be located above the lower surface in the axial direction of the disc mount portion 136 in the axial direction. The thickness of the reinforcing flange 138 is preferably 1.0 mm or more, more preferably about 3.0 mm.

The reinforcing flange 138 is accommodated in an annular flange accommodation portion 129 formed in a base plate 102. Between the reinforcing flange 138 and the flange accommodation portion 129 in the radial direction and in the axial direction are formed gaps L3 and L4, respectively, which are designed to have dimensions such that the reinforcing flange 138 and the flange accommodation portion 129 do not get into contact with each other.

In the spindle motor 101, since the strength of the disc mount portion 136 is improved by the reinforcing flange 138, it is possible to more reliably prevent the deformation of the disc mount portion 136 when the yoke 33 is press-fitted.

In the spindle motor 101, since the reinforcing flange 138 does not protrude from the disc mount portion 136 in the axial direction, it is possible locate a working tool radially outward of the annular projection 137 when the outer circumference of the annular projection 137 is processed. In other words, it is unnecessary to press a slender working tool in the axial direction. As a result, it is possible to reduce vibrations at the processing due to the slender working tool, thereby ensuring the machining accuracy. Consequently, it is possible to ensure the centering accuracy between the rotor hub 131, the yoke 33 and the rotor magnet 34, thereby ensuring the flatness of the recording discs 81.

Furthermore, in the spindle motor 101, since the reinforcing flange 138 is accommodated into the flange accommodation portion 129 of the base plate 102, the reinforcing flange 138 and the flange accommodation portion 129 make a labyrinth structure therebetween. As a result, by the reinforcing flange 138 and the flange accommodation portion 129, it is possible to partition an region containing the recording discs 81 where cleanliness is required off a region in which the rotor magnet 34 and the stator 5 are accommodated. Consequently, it is possible to suppress the out gas or the like generated from the adhesive for fixation leaking into the region containing the recording discs 81, thereby maintaining the cleanliness in the region containing the recording discs 81.

Figure 5:
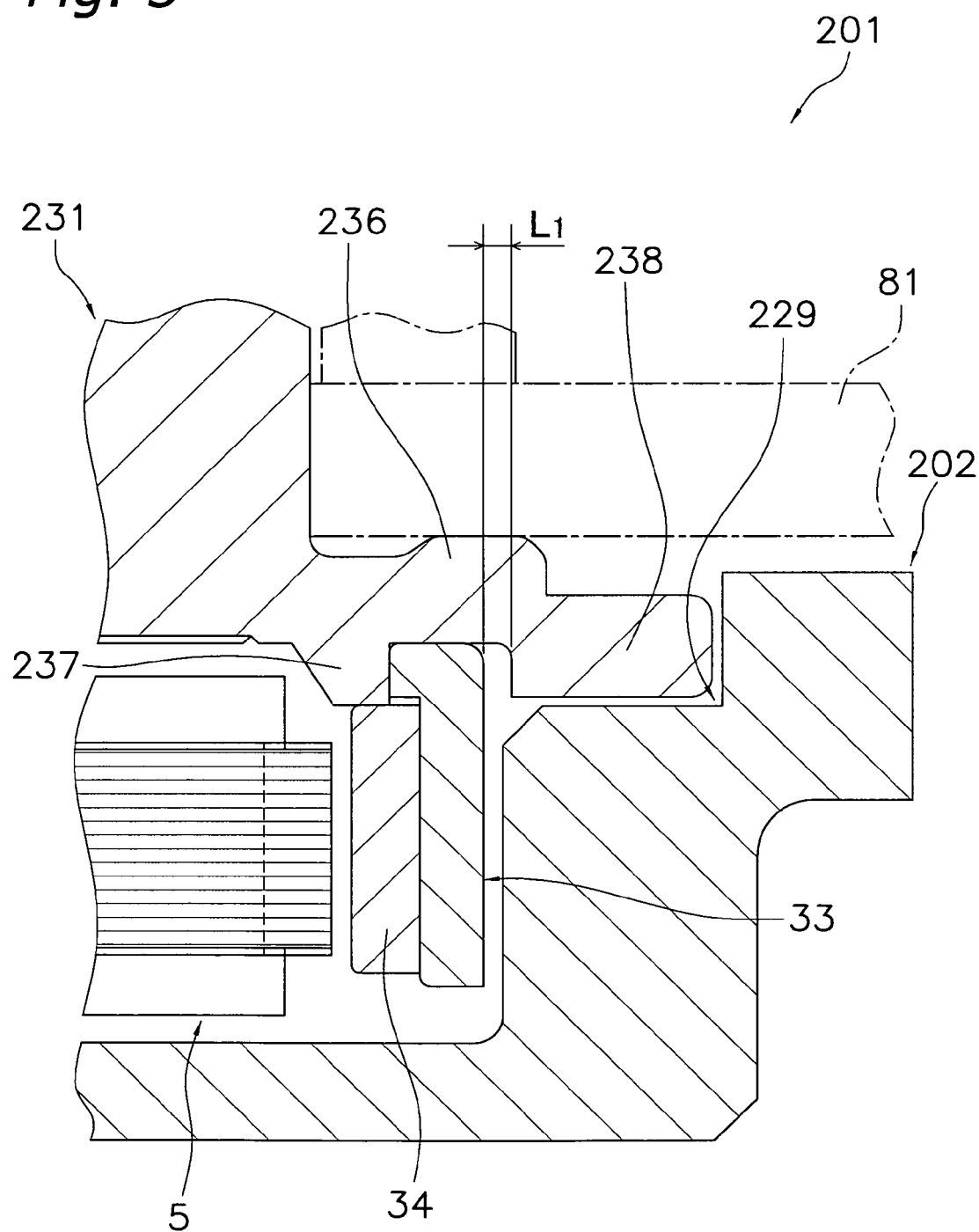
FIG. 5 is a fragmentary sectional view of a portion around the rotor hub 231 as a modification of the second embodiment according to the present invention.

As a modification of the above-described second embodiment, the following example will be described. FIG. 5 shows a fragmentary sectional view of a rotor hub 231 of a spindle motor 201 as a modification of second embodiment of the present invention. In this case, as in the second embodiment, a reinforcing flange 238 does not protrude from a disc mount portion 236 upward in the axial direction, but protrudes from the disc mount portion 236 downward in the axial direction. Between a projecting portion of the reinforcing flange 238 and the yoke 33 in the radial direction is defined a gap L1 (first gap) in the radial direction. The reinforcing flange 238 is accommodated in an annular flange accommodation portion 229 formed in a base plate 202.

In this case, since the reinforcing flange 238 protrudes from the disc mount portion 236 downward in the axial direction, it is possible to design the thickness of the reinforcing flange 238 to be larger than the disc mount portion 236. This further improves the strength of the disc mount portion 236.

In the spindle motor 201, since the gap L1 is defined between the reinforcing flange 238 and the yoke 33 in the radial direction, even if the adhesive is squeezed out when the yoke 33 is bonded to the annular projection 237, there are no possibility that the yoke 33 and the reinforcing flange 238 are bonded to each other by the adhesive. Consequently, it is possible to reduce the deformation of the disc mount portion 236 and the reinforcing flange 238 due to the adhesive. The gap L1 is preferably 0.1 mm or more, more preferably 0.2 mm or more.

Third Embodiment

Figure 6:
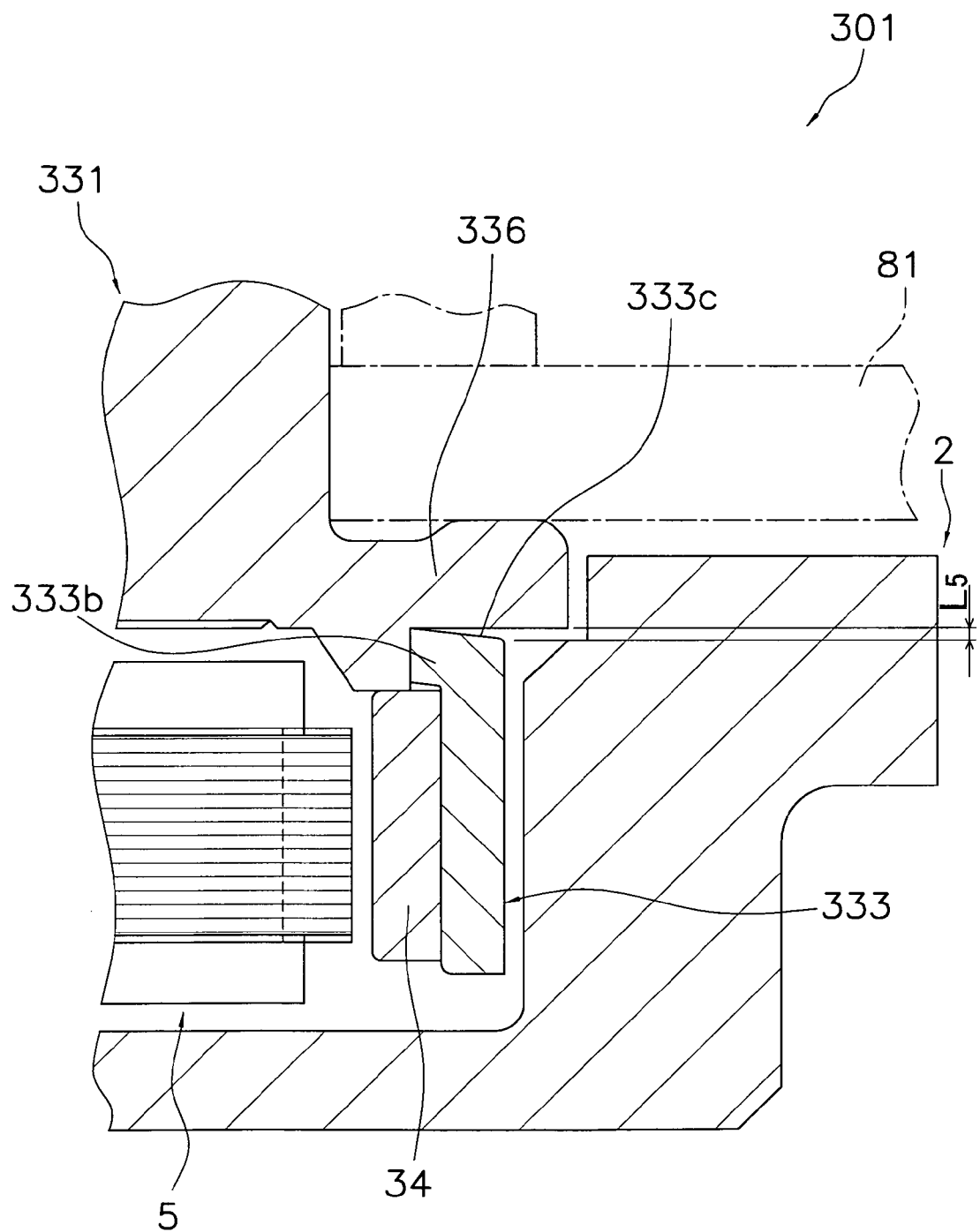
FIG. 6 is a fragmentary sectional view of a portion around the rotor hub 331 in the third embodiment according to the present invention.

In addition to the above-described first and second embodiments, another embodiment will be described below. FIG. 6 shows a fragmentary sectional view of a rotor hub 331 of a spindle motor 301 according to the third embodiment of the present invention. In the spindle motor 301, only the inner circumferential edge of a fixing part 333b is in contact with a disc mount portion 336 in the axial direction. More specifically, a yoke 333 further has an inclined surface 333c on the upper end in the axial direction of the fixing part 333b that is inclined downward in the axial direction as it proceeds radially outward. Only the inner circumferential edge of the fixing part 333b, more specifically, only the inner circumferential edge of the inclined surface 333c is in contact with the disc mount portion 336. In other words, portions other than the inner circumferential edge of the fixing part 333b are not in contact with the disc mount portion 336, so that between the radially outer portion of the fixing part 333b and the disc mount portion 336 in the axial direction is formed a gap L5.

Consequently, the inner circumferential edge of the fixing part 333b can position the yoke 333 in the axial direction, thereby making it unnecessary to ensure the flatness of the end faces other than the inner circumferential edge. As a result, the process to improve the flatness of the end face of the yoke 333 becomes unnecessary, so that the cost of manufacturing can be reduced. In the spindle motor 301, since the yoke 333 has the inclined surface 333c, it is possible to design the inner circumferential edge of the fixing part 333b to be reliably in contact with the disc mount portion 336. If the gap L5 is set to be 20 micrometers or more, it is possible to obtain sufficient accuracy by normal products made by mold without any special process.

Figure 7:
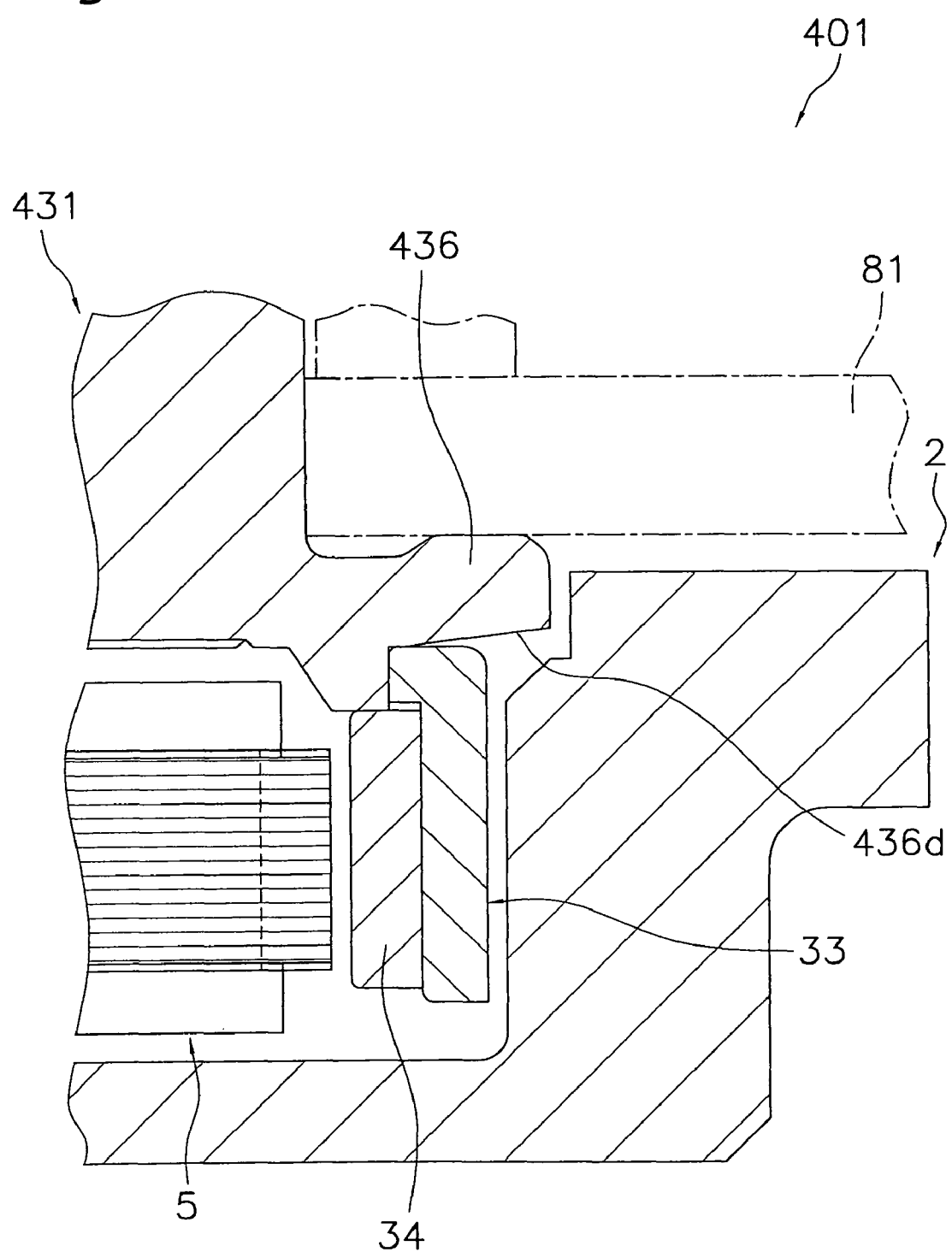
FIG. 7 is fragmentary sectional view of a portion around the rotor hub 431 as a modification of third embodiment according to the present invention.

As a modification of the third embodiment, the following case will be described below. FIG. 7 shows a longitudinal cross sectional schematic diagram of a spindle motor 401 as a modification of the third embodiment of the present invention. As shown in FIG. 7, in this modification, the above-described inclined surface 333c is formed on the disc mount portion 336, not on the yoke 333. More specifically, an inclined surface 436d is formed on the lower portion of a disc mount portion 436 in the axial direction, which is inclined upward in the axial direction as it proceeds radially outward. In the spindle motor 401, it is possible to obtain functions and effects similar to those in the above-described case using the inclined surface 333c. Inclined surfaces may be formed on both the yoke and disc mount portion.

Fourth Embodiment

Figure 8:
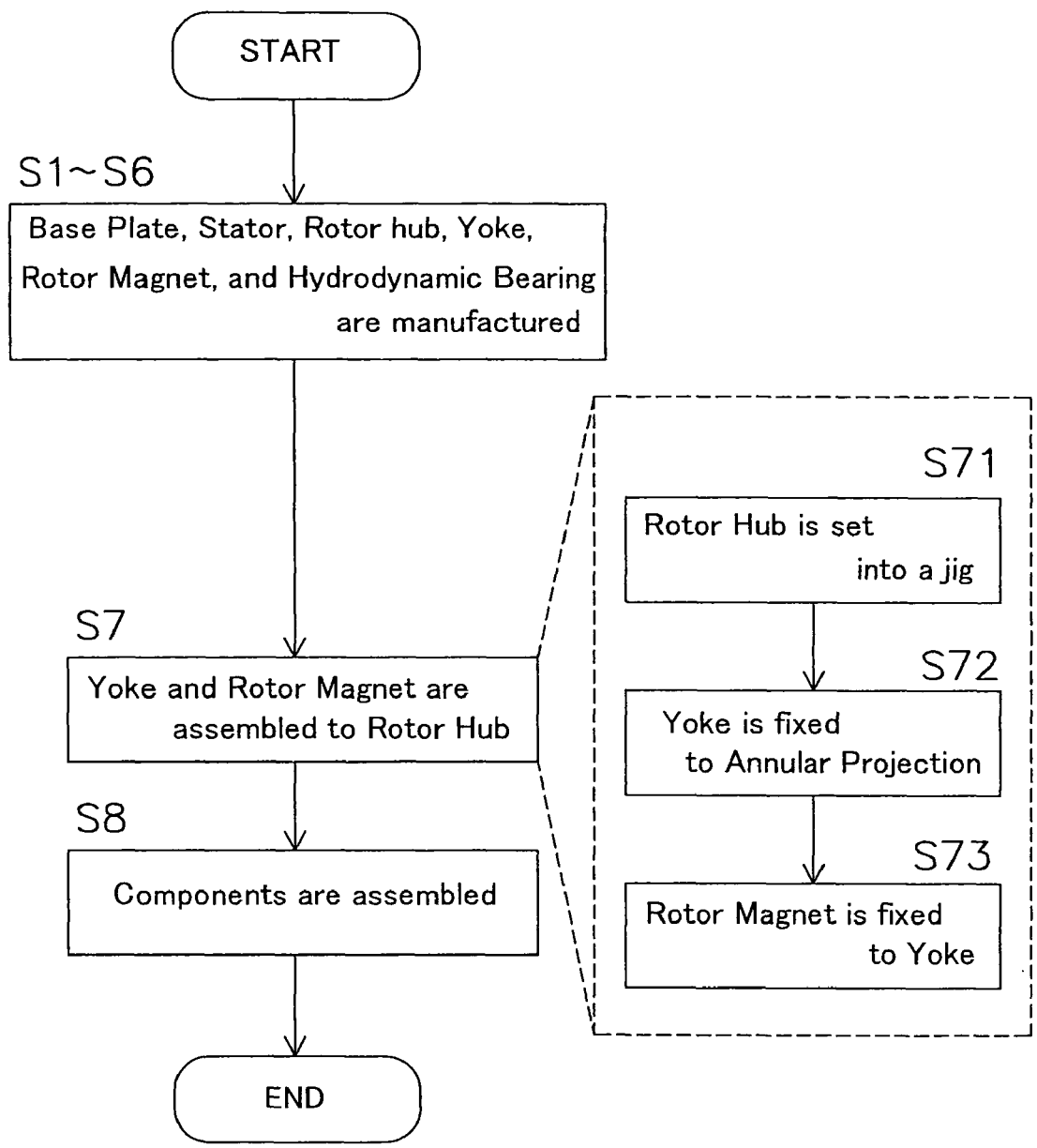
FIG. 8 is a flow diagram of the method for manufacturing spindle motor 1 in the fourth embodiment according to the present invention.

The present invention is also characterized in the manufacturing method. Here, a description will be made on a method of manufacturing the spindle motor 1 in the first embodiment. FIG. 8 shows a flow diagram of a method for manufacturing the spindle motor 1 according to the fourth embodiment of the present invention.

As shown in FIG. 8, the manufacturing method includes a base plate manufacturing step S1, a stator manufacturing step S2, a rotor hub manufacturing step S3, a yoke manufacturing step S4, a rotor magnet manufacturing step S5, a hydrodynamic bearing manufacturing step S6, a rotor assembling step S7, and an assembly step S8.

In the base plate manufacturing step S1, the base plate 2 is manufactured. In the stator manufacturing step S2, the stator 5 is manufactured. In the rotor hub manufacturing step S3, the rotor hub 31 is manufactured. In the yoke manufacturing step S4, the yoke 33 is manufactured. In the rotor magnet manufacturing step S5, the rotor magnet 34 is manufactured. In the hydrodynamic bearing manufacturing step S6, the hydrodynamic bearing 4 is manufactured. Since the above-mentioned steps S1 through S6 are the same as the conventional ones, the detailed description will be omitted.

In the rotor assembly process S7, the yoke 33 and the rotor magnet 34 are assembled to the rotor hub 31. More specifically, the rotor assembly process S7 further includes a setting step S71, a yoke assembling step S72, and a rotor magnet assembling step S73.

Figure 9:
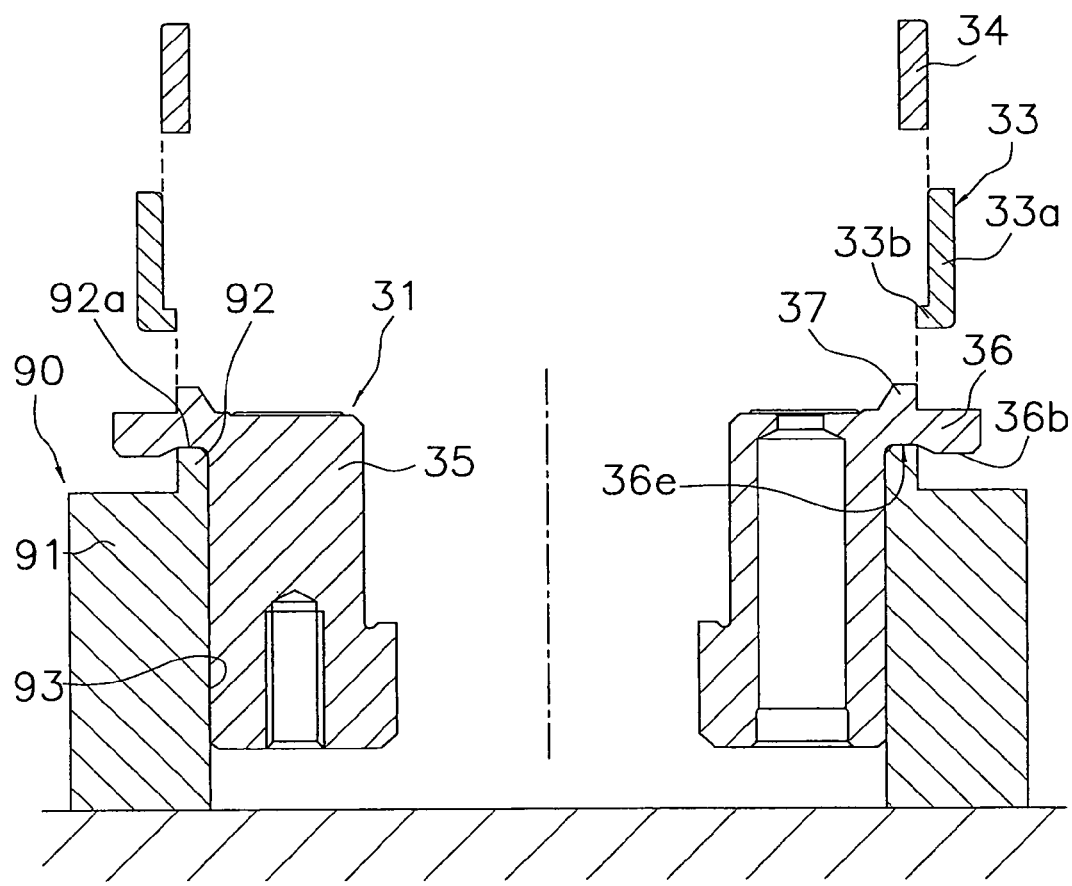
FIG. 9 is an assembly state diagram in the rotor assembling step S7.
Figure 11A:
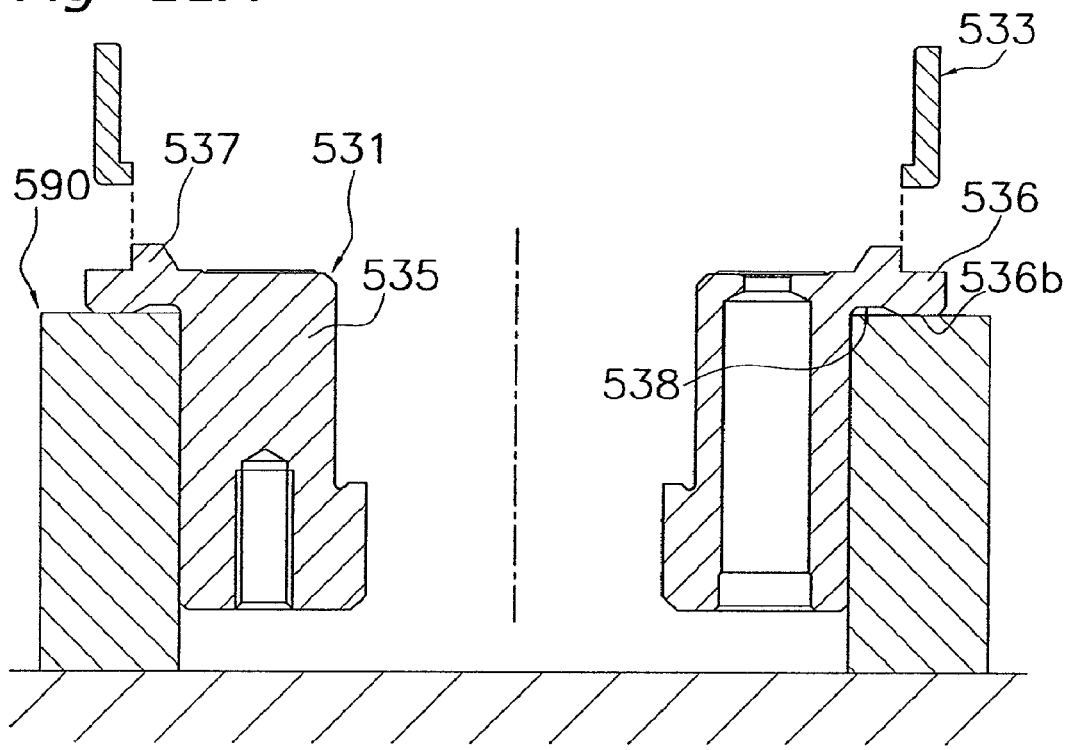
FIGS. 11A and 11B are views of conventional rotor hubs and yokes in an assembled state.
Figure 11B:
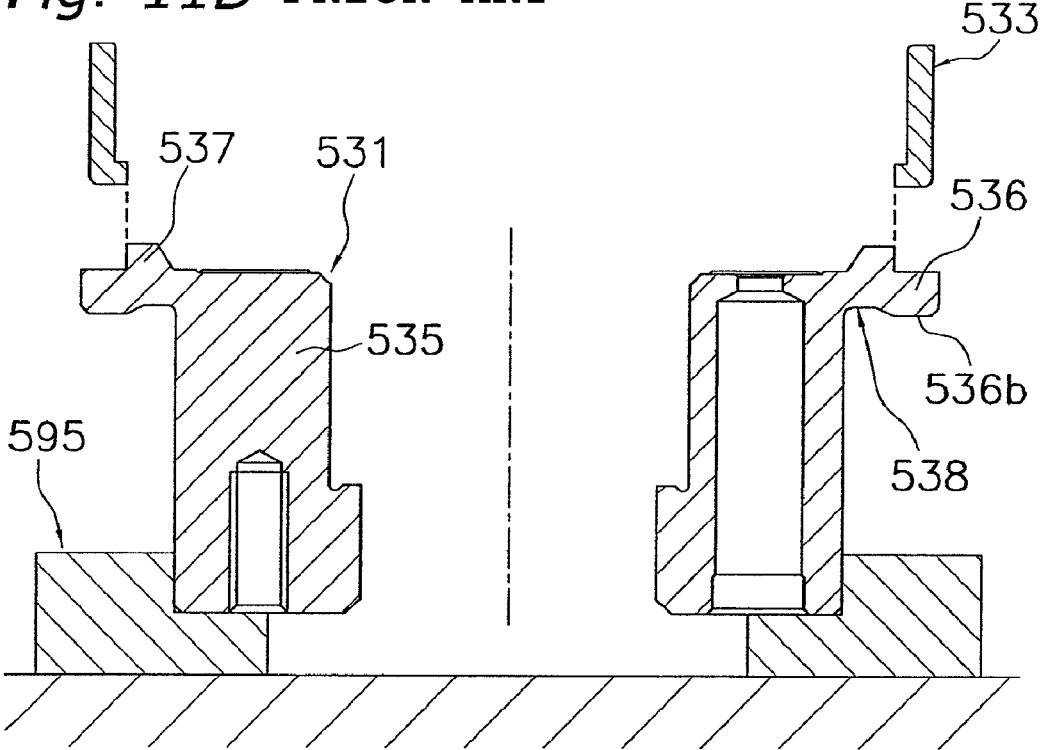
Figure 12:
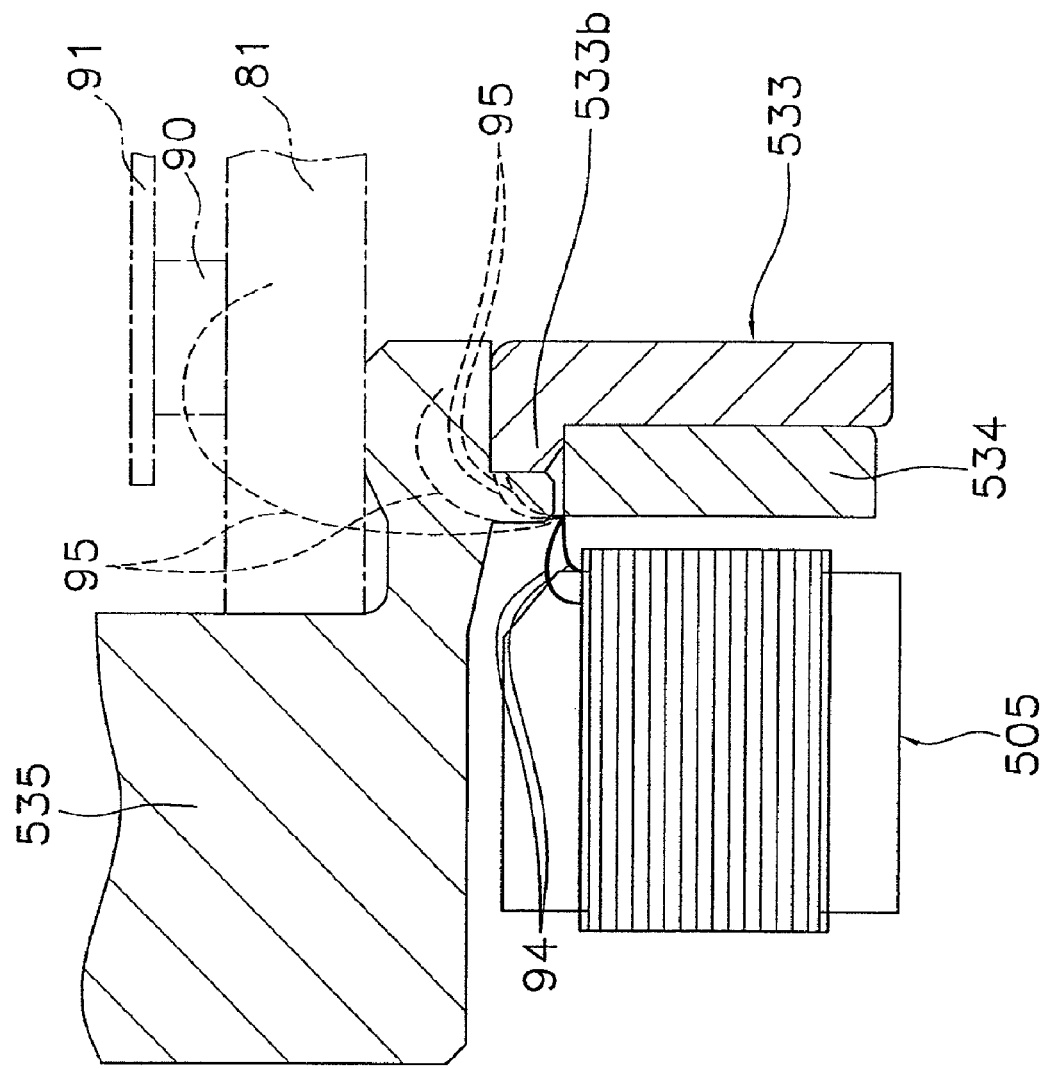
FIG. 12 is a magnetic flux diagram of the conventional yoke structure.

FIG. 9 shows an assembly state diagram in the rotor assembly process S7. As shown in FIG. 9, in the setting step S71, the rotor hub 31 is set into a jig 90. The jig 90 has a jig main body 91, an annular support portion 92, and a support hole 93. The jig main body 91 is a tubular portion. The annular support portion 92 is a tubular portion extending from the end of the jig main body 91 in the axial direction. The annular support portion 92 has an end in the axial direction on which a support end face 92a as an annular plane is formed. Inner circumferential surfaces of the jig main body 91 and the annular support portion 92 have the inner diameters aligned with each other. In other words, the support hole 93 is formed radially inward of the jig main body 91 and the annular support portion 92. In the setting step S71, the rotor hub 31 is set into the jig 90 such that the non-contact surface 36e of the rotor hub 31 and the support end face 92a of the jig 90 get into contact with each other in the axial direction. At this time, the disc support cylindrical portion 35 is fitted into the support hole 93.

Next, in the yoke assembling step S72, the yoke 33 is assembled to the rotor hub 31. More specifically, as shown in FIG. 9, the fixing part 33b of the yoke 33 is press-fitted around the outer circumference of the annular projection 37. Then, in the rotor magnet assembly process S73, the rotor magnet 34 is fixed to the inner circumference of the yoke main body 33a of the yoke 33.

Finally, in the assembly process S8, the stator 5, the rotor 3 and the hydrodynamic bearing 4 are assembled to the base plate 2, thereby finishing the spindle motor 1.

In the manufacturing method, since the non-contact surface 36e is supported by the annular support portion 92 of the jig 90 in the setting step S71, the axial load applied to the disc mount portion 36 can be reliably received by the jig 90 in the yoke assembling step S72, so that it is possible to prevent the bending moment from being applied to the radially inner portion of the disc mount portion 36. As a result, it is possible to prevent the deformation of the disc mount portion 36 when the yoke 33 is press-fitted, and it is unnecessary to process the disc receiving face 36b after the yoke 33 is press-fitted in order to ensure the flatness of the disc receiving face 36b. Consequently, in the manufacturing method, the cost of manufacturing the spindle motor 1 can be reduced.

In the manufacturing method, since the disc support cylindrical portion 35 is fitted into the support hole 93 in the setting step S71, it is easy to center the disc support cylindrical portion 35 relative to the jig 90. Accordingly, it is possible to reliably center the non-contact surface 36e of the rotor hub 31 relative to the annular support portion 92 of the jig 90, and the annular support portion 92 can reliably support the non-contact surface 36e.

Other Embodiments

The present invention is not limited to the above-described embodiments, and various modifications and amendments are possible without departing from the scope of the present invention.
(1) Type of the Hydrodynamic Bearings
In the above-described embodiments, the hydrodynamic bearing is of both-end-open type and shaft-fixed type. However, the present invention is not limited to this type, and the bearing may be of shaft-rotated type or one-side-open and shaft-fixed type, for example.
(2) Working Fluid
In the above-described embodiment, although the working fluid is lubricating oil, it can be an ionic liquid or the like.
(3) Base Plate Structure
In the above-described embodiments, the components constituting the motor are located on the base plate. However, the base plate may be a part of the housing of the disc device.
(4) Motor Structure
In the above-described second embodiment and fourth embodiments, a motor structure of what is called outer-rotor type in which the stator core is located radially inward of the rotor magnet is described. However, a motor structure of what is called inner-rotor type in which the inner circumference of the rotor magnet and the outer circumference of the yoke are bonded with each other and the stator core is located radially outward of the rotor magnet.
(5) Yoke Shape
In the above-described first embodiment, the yoke has an L-shape in cross section. However, the yoke may be a simple annular body having a cylindrical portion only.
(6) Combination of Each Component
In the above-described embodiments, each of the structures of the embodiments is described. However, the structures of the embodiments can be combined with each other. In this case, the functions and effects of the structures can be obtained depending on the combinations.
(7) Manufacturing Method
In the above-described fourth embodiment, some order of the steps is described. However, the present invention is not limited to the order. Other orders can be employed if the effects of the invention are obtained.
(8) Recording and Reproducing Apparatus
In the above-described embodiment, the present invention is applied to the spindle motor 1 as an example for explanation. However, the present invention is not limited to this example.

For example, as shown in FIG. 10, the present invention can be applied to a recording and reproducing apparatus 52 provided with the spindle motor 1 having the above-described structures in a housing 50. The apparatus 52 can reproduce the information recorded on the recording disc 38 and record the information into the recording disc 38 by a recording head 51.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Terms that are expressed as "means-plus function" in the claims should include any structure that can be utilized to carry out the function of that part of the present invention. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A spindle motor for rotatably driving at least one recording disc, said spindle motor comprising:
a base plate;
a stator disposed on said base plate, said stator having an outer circumference side;
a rotor hub configured to have the recording disc attached thereto;
an annular yoke disposed on said rotor hub;
an annular rotor magnet disposed on said yoke and located adjacent said outer circumference side of said stator so as to be opposite said stator in the radial direction; and
a hydrodynamic bearing disposed on said base plate, and configured to rotatably support said rotor hub relative to said base plate;
said rotor hub including
a disc support cylindrical portion configured to support said recording disc in the radial direction, and having an end surface,
an annular disc mount portion disposed around an outer circumference of said end of said disc support cylindrical portion, said annular disc mount portion protruding from the outer circumference of said end of said disc support cylindrical portion in the radial direction, said annular disc mount portion having
an annular disc receiving face arranged so as to enable the recording disc to be mounted thereon by contacting the recording disc in the axial direction,
a side axially opposite said annular disc receiving face, and
an annular non-contact surface arranged so as to face the recording disc via a gap in the axial direction in a position that is outside said disc support cylindrical portion in the radial direction and inside said annular disc receiving face in the radial direction, the annular non-contact surface including a corner flat portion, a step portion between said corner flat portion and said annular disc receiving face, and a corner portion between an outer circumference face of said disc support cylindrical portion and said corner flat portion, and
an annular projection formed on said annular disc mount portion on said side axially opposite said annular disc receiving face and having an outer circumference face to which said yoke is fixed,
wherein the outer diameter of the annular projection is smaller than the outer diameter of said step portion.

2. The spindle motor according to claim 1, wherein the outer diameter of said annular projection is larger than the outer diameter of said disc support cylindrical portion.

3. A spindle motor for rotatably driving at least one recording disc, said spindle motor comprising:
a base plate;
a stator disposed on said base plate, said stator having an outer circumference side;
a rotor hub configured to have the recording disc attached thereto;
an annular yoke disposed on said rotor hub;
an annular rotor magnet disposed on said yoke and located adjacent said outer circumference side of said stator so as to be opposite said stator in the radial direction; and
a hydrodynamic bearing disposed on said base plate, and configured to rotatably support said rotor hub relative to said base plate;
wherein said rotor hub includes
a disc support cylindrical portion configured to support the recording disc in the radial direction, and having an end surface,
an annular disc mount portion disposed around an outer circumference of said end of said disc support cylindrical portion, said annular disc mount portion protruding from the outer circumference of said end of said disc support cylindrical portion in the radial direction, said annular disc mount portion having an annular disc receiving face arranged so as to enable the recording disc to be mounted thereon by contacting the recording disc in the axial direction, and having a side axially opposite said annular disc receiving face, and
an annular projection disposed on said annular disc mount portion on said side axially opposite said annular disc receiving face in the radial direction, and having an outer circumference to which said yoke is fixed,
wherein said yoke includes a tubular yoke main body extending in the axial direction and having an inner circumference to which said rotor magnet is fixed, and an annular fixing part extending from an end of a main body of said yoke radially inward and fixed to the outer circumference of said annular projection, said annular fixing part of said yoke having an axial thickness that is smaller than the axial dimension of the annular projection, and
wherein a gap is defined between said annular fixing part of said yoke and said rotor magnet in the axial direction such that said annular fixing part of said yoke does not contact said rotor magnet in the axial direction.

4. A recording and reproducing apparatus comprising:
said spindle motor set forth in claim 1;
said recording disc attached to the rotor hub for recording information thereon;
an information access means for writing or reading information into or from certain positions in the recording disc.

5. A recording and reproducing apparatus comprising:
said spindle motor set forth in claim 3;
said recording disc attached to the rotor hub for recording information thereon;
an information access means for writing or reading information into or from certain positions in the recording disc.

6. The spindle motor according the claim 3, wherein said rotor magnet is in contact with said annular projection in said axial direction.

* * * * *